US009016442B2

(12) United States Patent
Odaira et al.

(10) Patent No.: US 9,016,442 B2
(45) Date of Patent: Apr. 28, 2015

(54) DISC BRAKE APPARATUS

(75) Inventors: Atsushi Odaira, Yokohama (JP); Kunihiro Matsunaga, Minami-ALPS (JP)

(73) Assignee: Hitachi Automotive Systems, Ltd., Ibaraki (JP)

(*) Notice: Subject to any disclaimer, the term of this patent is extended or adjusted under 35 U.S.C. 154(b) by 207 days.

(21) Appl. No.: 13/536,161

(22) Filed: Jun. 28, 2012

(65) Prior Publication Data
US 2013/0001024 A1 Jan. 3, 2013

(30) Foreign Application Priority Data

Jun. 30, 2011 (JP) .................................. 2011-146727

(51) Int. Cl.
| | | |
|---|---|---|
| F16D 55/22 | (2006.01) | |
| F16D 55/226 | (2006.01) | |
| F16D 65/00 | (2006.01) | |
| F16D 65/097 | (2006.01) | |
| F16D 55/00 | (2006.01) | |
| F16D 121/04 | (2012.01) | |

(52) U.S. Cl.
CPC .......... *F16D 55/226* (2013.01); *F16D 65/0006* (2013.01); *F16D 65/0972* (2013.01); *F16D 2055/0041* (2013.01); *F16D 2121/04* (2013.01)

(58) Field of Classification Search
CPC ....... F16D 55/26; F16D 55/31; F16D 65/006; F16D 65/0972; F16D 65/0977; F16D 2055/0041
USPC ................ 188/72.3, 71.7, 71.8, 73.31–73.38, 188/73.43, 73.44, 205 A, 216, 250 G
See application file for complete search history.

(56) References Cited

U.S. PATENT DOCUMENTS

| | | | | |
|---|---|---|---|---|
| 4,180,148 | A | * | 12/1979 | Souma ........................ 188/73.38 |
| 4,460,071 | A | * | 7/1984 | Seki ............................ 188/73.39 |
| 5,284,228 | A | * | 2/1994 | Weiler et al. ................. 188/71.8 |

(Continued)

FOREIGN PATENT DOCUMENTS

| | | |
|---|---|---|
| JP | 7-23833 | 5/1995 |
| JP | 7-280005 | 10/1995 |

(Continued)

OTHER PUBLICATIONS

Office Action issued Feb. 24, 2015 in corresponding Japanese patent application No. 2011-146727 (with partial English translation).

*Primary Examiner* — Pamela Rodriguez
(74) *Attorney, Agent, or Firm* — Wenderoth, Lind & Ponack, LLP

(57) ABSTRACT

An abutment-plate portion of a main body portion of a biasing member, which faces a disc rotor in an axial direction, includes a pad-return portion for biasing a friction pad in a direction separating apart from the disc rotor, and upper and lower claw portions which are located separately on the upper and lower sides of the pad-return portion. The upper and lower claw portions of the biasing member are brought into abutment against upper and lower groove portions respectively with a frictional resistance When a lining of the friction pad is worn away and the friction pad is pressed in a direction approaching to the disc rotor in accordance with the wear of the lining, the movement of the entire biasing member in the direction approaching to the disc rotor inside a pad guide is allowed by the upper and lower claw portions serving as wear-following portions.

20 Claims, 17 Drawing Sheets

(56) References Cited

U.S. PATENT DOCUMENTS

| | | | |
|---|---|---|---|
| 5,706,916 A | 1/1998 | Cortes Guasch et al. | |
| 6,223,866 B1 * | 5/2001 | Giacomazza | 188/73.38 |
| 6,527,090 B1 * | 3/2003 | Barillot et al. | 188/73.38 |
| 6,959,792 B2 * | 11/2005 | Ashman et al. | 188/73.38 |
| 7,318,503 B2 * | 1/2008 | Farooq | 188/73.36 |
| 8,540,060 B2 * | 9/2013 | Hayashi et al. | 188/72.3 |
| 8,684,148 B2 * | 4/2014 | Wakabayashi et al. | 188/73.36 |
| 2013/0192939 A1 * | 8/2013 | V. et al. | 188/73.38 |

FOREIGN PATENT DOCUMENTS

| | | |
|---|---|---|
| JP | 10-503267 | 3/1998 |
| JP | 2010-236655 | 10/2010 |

* cited by examiner

DISC BRAKE APPARATUS

BACKGROUND OF THE INVENTION

1. Technical Field

The present invention relates to a disc brake apparatus for applying a braking force to a vehicle such as an automobile.

2. Background Art

In general, a disc brake apparatus provided to a vehicle such as an automobile includes a mounting member, a caliper, and a pair of friction pads. The mounting member is mounted to a non-rotating portion of the vehicle. The mounting member includes a pair of arms which are separated apart from each other in a direction of rotation of a disc rotor so that each of the arms passes over an outer circumferential side of the disc rotor in an axial direction. The caliper is movably provided to the arms of the mounting member. The pair of friction pads are movably supported by the arms of the mounting member and are pressed against both surfaces of the disc rotor by the caliper, respectively. There is also known a disc brake apparatus which includes biasing members respectively provided between the arms of the mounting member and the friction pads (for example, see Japanese Patent Domestic Announcement No. Hei 10-503267. The biasing members elastically bias the friction pads in a direction separating apart from the disc rotor.

In the conventional technology described above, a single spring piece is provided to each of the biasing members respectively provided between the arms of the mounting member and the friction pads so as to prevent pad dragging when a braking operation is released. The spring piece has both the function of returning the corresponding friction pad to a non-braking position and the function of enabling the movement of the corresponding biasing member relative to the arm in accordance with the wear of the friction pads. However, the spring piece of each of the biasing members described above has a problem in that a portion which is placed in a locked state with respect to the corresponding arm of the mounting member is likely to be worn away at an early time to lower durability and a lifetime.

SUMMARY OF THE INVENTION

The present invention has been made in view of the problem of the conventional technology described above, and therefore has an object to provide a disc brake apparatus capable of suppressing the wear of a biasing member to improve durability and a lifetime.

According to an exemplary embodiment of the present invention, there is provided a disc brake apparatus, including: a caliper to be mounted to a non-rotating portion of a vehicle; a friction pad including a lining made of a friction material, the friction pad being provided to face the disc rotor and pressed by the caliper toward the disc rotor; two guide surfaces provided to the caliper, the two guide surfaces extending in a direction of movement of the friction pad; and a biasing member to be brought into abutment against the two guide surfaces and provided so as to be movable in a direction approaching to the disc rotor in accordance with wear of the lining of the friction pad. The biasing member includes: a first spring part for biasing the friction pad in a direction separating apart from the disc rotor; and a second spring part to be brought into abutment against one of the two guide surfaces, for biasing the caliper toward another of the two guide surfaces. The second spring part restricts the movement of the biasing member relative to the caliper until the first spring part is elastically deformed by a predetermined deflection amount by the movement of the friction pad.

EMBODIMENT OF THE INVENTION

Hereinafter, a disc brake apparatus according to each of embodiments is described in detail referring to the accompanying drawings.

Figure 1:
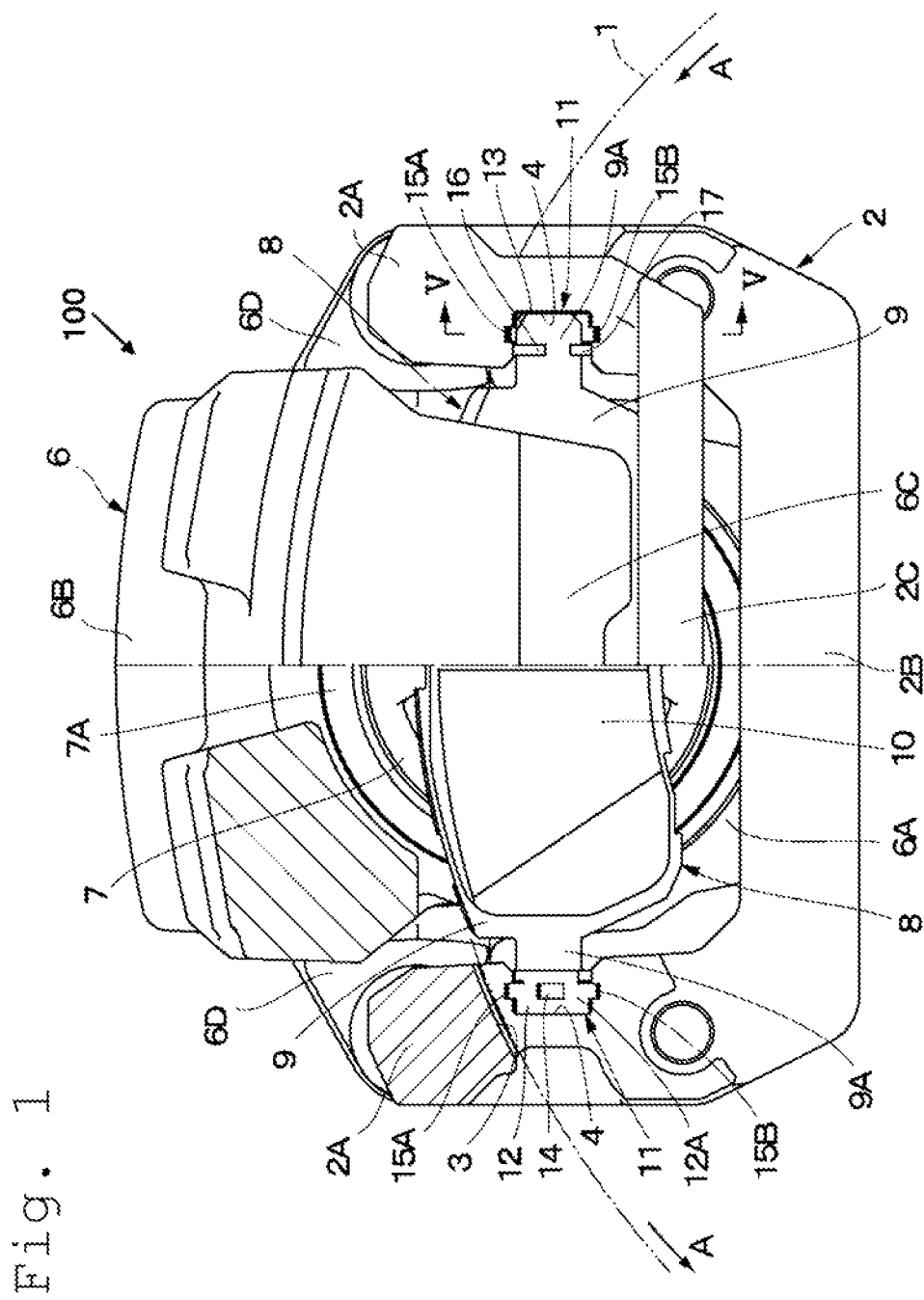
FIG. 1 is a partially cut-away front view illustrating a disc brake apparatus according to a first embodiment.

FIGS. 1 to 8 illustrate a disc brake apparatus according to a first embodiment. In description of this embodiment, a floating-type disc brake apparatus is taken as an example. However, the present invention is applicable also to what is called an opposed-type disc brake apparatus, in which a caliper having a cylinder and a piston respectively provided on both sides of a disc rotor so as to oppose each other is fixed to a non-rotating portion of a vehicle. In FIG. 1, a disc rotor 1, which is rotatable, is illustrated. The disc rotor 1 rotates, for example, in a direction indicated by the arrows A illustrated in FIG. 1 together with wheels (not shown) when a vehicle runs forward and rotates in the direction opposite to the direction indicated by the arrows A when the vehicle moves backward.

A caliper 100 is a floating-type caliper as an example of a caliper according to the present invention, and includes a mounting member 2 and a caliper main body 6 which is slidably provided to the mounting member 2. In other words, in this embodiment, the mounting member and the caliper main body constitute the caliper. The mounting member 2 is mounted to a non-rotating portion of the vehicle, and includes a pair of arms 2A and a bearing portion 2B, as illustrated in FIG. 1. The pair of arms 2A are provided so as to be separated apart from each other in a direction of rotation of the disc rotor 1 (hereinafter, referred to as "disc circumferential direction") and extend in an axial direction of the disc rotor 1 so as to pass over an outer circumference of the disc rotor 1. The bearing portion 2B has a large thickness and is provided to connect the respective base ends of the arms 2A so as to integrate the arms 2A. The bearing portion 2B is fixed to the non-rotating portion of the vehicle at a position on the inner side of the disc rotor 1.

A reinforcing beam 2C is formed integrally with the mounting member 2. The reinforcing beam 2C connects the respective distal ends of the arms 2A at a position on an outer side of the disc rotor 1. In this manner, the arms 2A are connected integrally by the bearing portion 2B on the inner side of the disc rotor 1 and are connected integrally by the reinforcing beam 2C on the outer side of the disc rotor 1.

At a position of each of the arms 2A of the mounting member 2 which corresponds to a middle portion of the disc rotor 1 in an axial direction thereof (hereinafter, referred to as "disc axial direction"), a disc-path portion 3 (see a left part of FIG. 1), which extends in an arc-like manner along the outer circumference (locus of rotation) of the disc rotor 1, is formed. On both sides of the disc-path portion 3 in the disc axial direction, an inner-side pad guide 4 and an outer-side pad guide 4 are formed. A pin hole (not shown) extending in the disc axial direction is provided to each of the arms 2A. A sliding pin (not shown) on the side of the caliper main body 6 described later is slidably inserted into each of the pin holes.

The pad guide 4 of each of the arms 2A is formed as a concave portion having a U-like shape as illustrated in FIG. 1 and extends in the disc axial direction in which friction pads 8 described below slide and are displaced. Specifically, as illustrated in FIGS. 3 and 5 to 8, each of the pad guides 4, which is formed as the concave portion having the U-like shape, includes one side surface portion 4A (hereinafter, referred to as "upper wall surface 4A"), the other side surface portion 4B (hereinafter, referred to as "lower wall surface 4B"), and a far-side wall surface 4C. The upper wall surface 4A is located on the outer side in a disc radial direction, whereas the lower wall surface 4B is located on the inner side in the disc radial direction. The far-side wall surface 4C is located on the far side of the pad guide 4 so as to connect the upper wall surface 4A and the lower wall surface 4B to each other.

Each of ear portions 9A of the friction pads 8 described later is fitted by recess-projection fitting between the upper wall surface 4A and the lower wall surface 4B of the pad guide 4. In this manner, each of the ear portions 9A is supported movably in the disc axial direction along the upper wall surface 4A and the lower wall surface 4B. The far-side wall surface 4C of the pad guide 4 constitutes a torque-receiving portion which receives a braking torque generated at the time of a brake operation from the friction pad 8 through each of the ear portions 9A.

As illustrated in FIGS. 3 and 5 to 8, an upper groove portion 5A serving as one guide surface is formed on the upper wall surface 4A of the pad guide 4, whereas a lower groove portion 5B serving as the other guide surface is formed on the lower wall surface 4B of the pad guide 4. The upper groove portion 5A has a U-like cross section and extends in the disc axial direction. Similarly, the lower groove portion 5B has a U-like cross section and extends in the disc axial direction. An upper claw portion 15A of a biasing member 11 described below is fitted into the upper groove portion 5A, whereas a lower claw portion 15B described later is fitted into the lower groove portion 5B.

The floating-type caliper main body 6 is slidably provided to the mounting member 2. The caliper main body 6 includes an inner leg portion 6A, a bridge portion 6B, and an outer leg portion 6C. The inner leg portion 6A is provided on the inner side which is one side of the disc rotor 1, as illustrated in FIG. 1. The bridge portion 6B is provided between the arm portions 2A of the mounting member 2 so as to extend from the inner leg portion 6A to the outer side which is the other side of the disc rotor 1 so as to pass over the outer circumferential side of the disc rotor 1. The outer leg portion 6C extends inward in the radial direction of the disc rotor 1 from the outer side which is the distal end side of the bridge portion 6B and functions as a claw portion having a bifurcated distal end.

A cylinder (not shown), into which a piston 7 is slidably inserted, is provided to the inner leg portion 6A of the caliper main body 6. A piston seal 7A is provided to the piston 7. A pair of mounting portions 6D, which respectively project toward the right and the left in FIG. 1, are provided to the inner leg portion 6A. A sliding pin (not shown) is provided to each of the mounting portions 6D. The sliding pins are slidably inserted into the pin holes so as to movably support the entire caliper main body 6 to the respective arms 2A of the mounting member 2.

Figure 2:
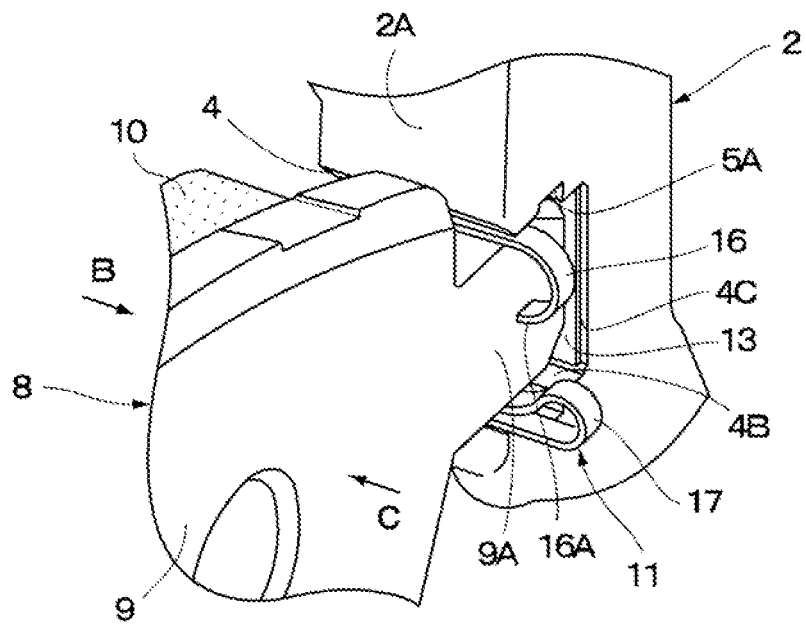
FIG. 2 is a partial perspective view illustrating a state in which a friction pad is mounted to a pad guide of a mounting member through an intermediation of a biasing member.

The friction pad 8 on the inner side and the friction pad 8 on the outer side are provided between the arms 2A of the mounting member 2 so as to face the two surfaces of the disc rotor 1, respectively. Each of the friction pads 8 includes, as illustrated in FIGS. 1 and 2, a back plate 9 and a lining 10. The back plate 9 has a flat-plate like shape and extends in the disc circumferential direction to form an approximately fan-like shape. The lining 10 is provided fixedly to one surface side of the back plate 9 and comes into friction contact with the surface of the disc rotor 1. The lining 10 is made of a friction material.

A pair of the ear portions 9A are provided to the back plate 9 of each of the friction pads 8. The pair of ear portions 9A are provided as convex portions on side surfaces located on both sides of the back plate 9 in the disc circumferential direction. Each of the ear portions 9A is fitted by recess-projection fitting between the upper wall surface 4A and the lower wall surface 4B of the pad guide 4 through an intermediation of the biasing member 11 described below. Each of the ear portions 9A of the back plate 9 constitutes a torque transmitting portion which comes into abutment against the far-side wall surface 4C of the mounting member 2 so as to transmit a braking torque received by the corresponding one of the friction pad 8 from the disc rotor 1 at the time of the braking operation of the vehicle.

The ear portions 9A of each of the friction pads 8 (back plate 9), each having the same shape, are formed horizontally symmetric. One of the ear portions 9A of each of the friction pads 8 is located on an incoming side of the rotating direction (disc-incoming side) of the disc rotor 1, which rotates in the direction indicated by the arrows A when the vehicle moves forward, whereas the other ear portion 9A is located on an outgoing side of the rotating direction (disc-outgoing side) of the disc rotor 1.

Four biasing members 11 in total are mounted to the arm portions 2A of the mounting member 2 so that each of the biasing members 11 is located between each of the ear portions 9A of the friction pads 8 and each of the pad guides 4. The biasing members 11 elastically support the respective ear portions 9A of the friction pad 8 on the inner side and the friction pad 8 on the outer side inside the respective pad guides 4. In addition, the biasing members 11 have the function of smoothing the sliding displacement of the friction pads 8 in the disc axial direction and serve as pad springs, respectively.

Figure 3:
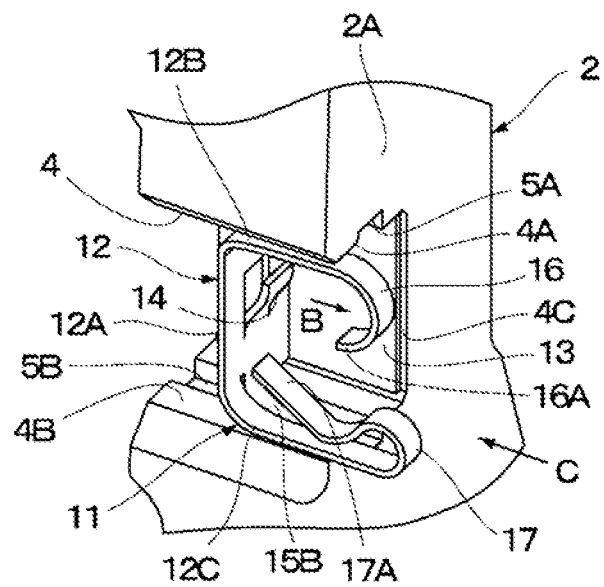
FIG. 3 is a partial perspective view illustrating the pad guide and the biasing member in a state in which the friction pad illustrated in FIG. 2 is removed.
Figure 4:
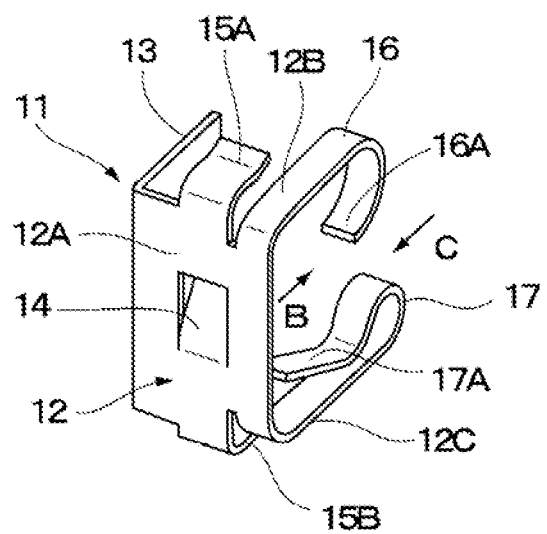
FIG. 4 a perspective view illustrating the biasing member illustrated in FIG. 3 as a single body, as viewed from a direction different from that of FIG. 3.

The biasing members 11 have both the function of returning the friction pads 8 to non-braking positions (return positions before braking) by pad-return portions 14 described below and the function of allowing the relative movement of the biasing members 11 in accordance with the wear of the linings 10 of the friction pads 8 within the pad guides 4 in the disc axial direction when the linings 10 of the friction pads 8 are worn away. Each of the biasing members 11 is formed by performing a bending process (press molding) on a stainless steel plate or the like having spring properties as illustrated in FIGS. 3 and 4.

Each of the biasing members 11 includes a main body portion 12, a far-side plate portion 13, the pad-return portion 14, the upper claw portion 15A and the lower claw portion 15B, each serving as a wear-following portion, a return-restricting portion 16, and a radially-biasing portion 17 described below. In the following description, for each of the portions of each of the biasing members 11, the terms "upper", "upper surface" and "upward" are used to respectively refer to a radially outer side and a radially outer surface of the disc rotor 1, and outward in the radial direction of the disc rotor 1, and the terms "lower", "lower surface", and "downward" are used to respectively refer to a radially inner side and a radially inner surface of the disc rotor 1, and inward in the radial direction of the disc rotor 1.

Figure 7:
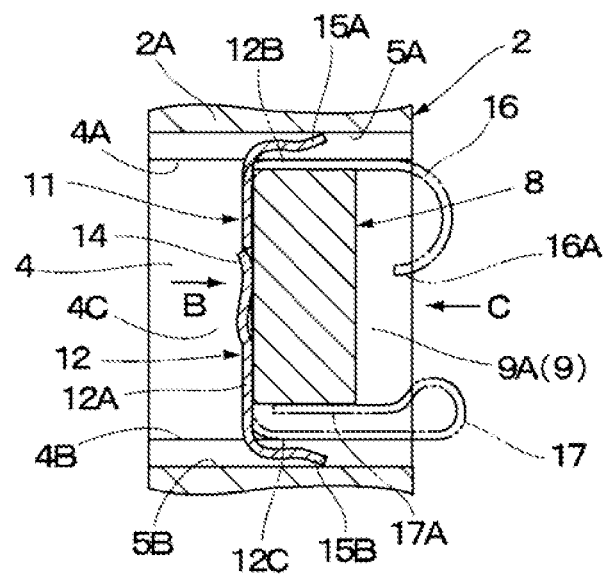
FIG. 7 is a partial sectional view illustrating an initial state of wear of the friction pad, which is taken at the same position as that illustrated in FIG. 5.
Figure 8:
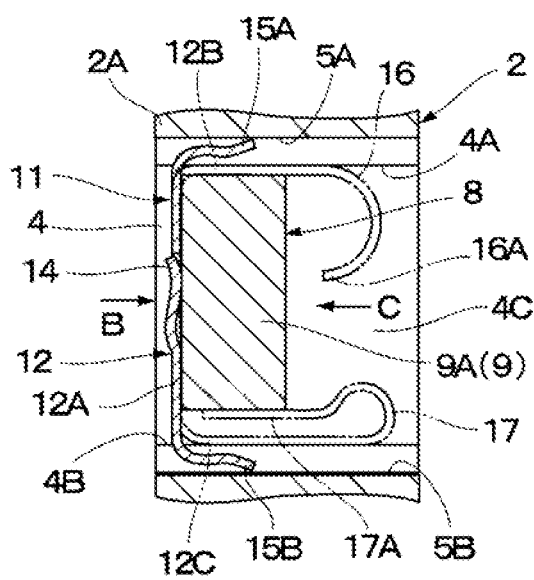
FIG. 8 is a partial sectional view illustrating a state in which the biasing member moves inside the pad guide in accordance with the wear of the friction pad, which is taken at the same position as that illustrated in FIG. 5.

The main body portion 12 of each of the biasing members 11 is formed as a flat surface portion extending vertically between the upper wall surface 4A and the lower wall surface 4B of the pad guide 4. The main body portion 12 includes an abutment-plate portion 12A and two facing plate portions 12B and 12C of a concave portion (hereinafter, referred to as "concave-portion facing-plate portions 12B and 12C"), and is formed to have a U-like shape as a whole. The abutment-plate portion 12A serves as a rotor-facing plate portion which is located at a position at which the abutment-plate portion 12A faces the surface of the disc rotor 1 in the disc axial direction. The concave-portion facing plate portions 12B and 12C are formed integrally with the abutment-plate portion 12A respectively on the upper end side and the lower end side of the abutment-plate portion 12A. The corresponding one of the ear portions 9A of each of the friction pads 8 comes into direct abutment against the abutment-plate portion 12A of the main body portion 12 when the pad-return portion 14 described below is greatly flexurally deformed as illustrated in FIGS. 7 and 8. The pad-return portion 14, the upper claw portion 15A, and the lower claw portion 15B described below extend from the abutment-plate portion 12A of the main body portion 12.

The upper concave-portion facing plate portion 12B is bent at the upper end of the abutment-plate portion 12A so as to be curved into an approximately L-like shape, and is provided to face the upper wall surface 4A of the pad guide 4 forming the concave portion so as to be held in surface contact with the upper wall surface 4A. The return-restricting portion 16 described below is integrally formed with the concave-portion facing plate portion 12B at the distal end thereof. The lower concave-portion facing plate portion 12C is bent at the lower end of the abutment-plate portion 12A so as to be curved into an approximate L-like shape, and is provided to face the lower wall surface 4B of the pad guide 4 so as to be held in surface contact with the lower wall surface 4B. The radially-biasing portion 17 described below is formed integrally with the concave-portion facing plate portion 12C at the distal end thereof.

The far-side plate portion 13 of the biasing member 11 is formed so as to be bent in an L-like shape at a right angle with respect to the abutment-plate portion 12A of the main body portion 12. The far-side plate portion 13 is formed as a flat-surface portion which is abutted against the far-side wall surface 4C of the pad guide 4 so as to be held in surface contact with the far-side wall surface 4C over a large area, as illustrated in FIG. 3. The far-side plate portion 13 has the function of receiving the braking torque acting on the corresponding friction pad 8 at the time of braking, together with the far-side wall surface 4C. The biasing member 11 covers the corresponding ear portion 9A of the friction pad 8 with the abutment-plate portion 12A from the disc axial direction and is locked in an elastically deformed state inside the pad guide 4 by the claw portions 15A and 15B described below.

In the center of the abutment-plate portion 12A, the pad-return portion 14 serving as a first spring part is bent at an angle inwardly in the disc axial direction. The pad-return portion 14 is elastically held in abutment against the ear portion 9A of the friction pad 8 from the side of an inner surface of the friction pad so as to bias the friction pad 8 toward the position (return position) separated apart from the disc rotor 1 in a direction indicated by the arrow B. The upper claw portion 15A and the lower claw portion 15B serving as second spring parts (wear-following portions) are provided to the abutment-plate portion 12A so as to be separated apart from each other on the upper side and the lower side of the pad-return portion 14. Each of the upper claw portion 15A and the lower claw portion 15B is formed by being bent into an approximately L-like shape.

The upper claw portion 15A is mounted in an elastically deformed state in the upper groove portion 5A of the pad guide 4 with an interference therebetween so as to abut against the upper groove portion 5A. The upper claw portion 15A biases the entire biasing member 11 toward the lower wall surface 4B (lower groove portion 5B) of the pad guide 4, and biases the mounting member 2 of the caliper 100 toward the lower groove portion 5B. The lower claw portion 15B is mounted in an elastically deformed state in the lower groove portion 5B of the pad guide 4 with an interference therebetween so as to abut against the lower groove portion 5B. The lower claw portion 15B biases the entire biasing member 11 toward the upper wall surface 4A (upper groove portion 5A) of the pad guide 4, and biases the mounting member 2 of the caliper 100 toward the upper groove portion 5A.

Figure 5:
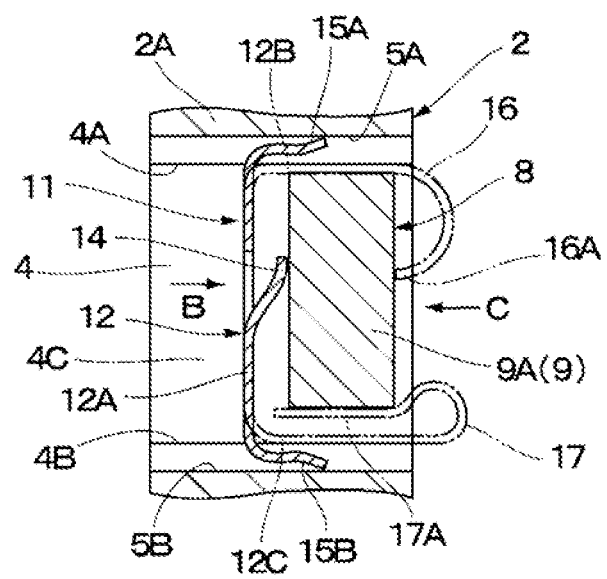
FIG. 5 is a partial sectional view illustrating the friction pad, which is mounted to the pad guide through an intermediation of the biasing member, as viewed from a direction indicated by the arrow V-V of FIG. 1.
Figure 6:
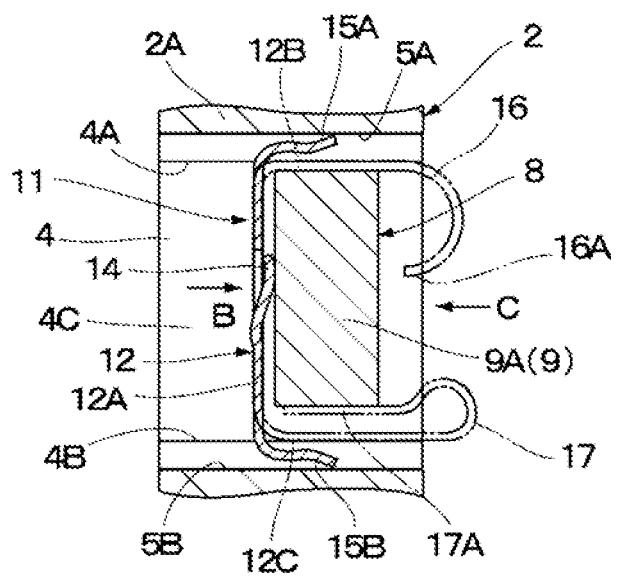
FIG. 6 is a partial sectional view illustrating a state in which the friction pad is displaced to a braking position, which is taken at the same position as that illustrated in FIG. 5.

Therefore, while the pad-return portion 14 is flexurally deformed as illustrated in FIGS. 5 and 6, the biasing member 11 remains in the illustrated position in accordance with a biasing force applied by the upper claw portion 15A and the lower claw portion 15B (frictional resistance against the upper groove portion 5A and the lower groove portion 5B), and hence the biasing member 11 does not move within the pad guide 4 in the disc axial direction (directions indicated by the arrows B and C). However, when the pad-return portion 14 is greatly flexurally deformed as illustrated in FIGS. 7 and 8 to be elastically deformed by the amount equal to or larger than a predetermined deflection amount to a position at which the inner surface of the ear portion 9A comes into direct abutment against the abutment-plate portion 12A, the biasing member 11 can move within the pad guide 4 in the disc axial direction (the direction indicated by the arrow C opposite to the direction indicated by the arrow B) regardless of the biasing force applied by the upper claw portion 15A and the lower claw portion 15B (frictional resistance against the upper groove portion 5A and the lower groove portion 5B).

Specifically, the sum of the frictional resistance of the upper claw portion 15A against the upper groove portion 5A and the frictional resistance of the lower claw portion 15B against the lower groove portion 5B is set to a value larger than that of the spring force (biasing force) of the pad-return portion 14. However, while the braking operation is repeated, the lining 10 of each of the friction pads 8 is worn away. When the friction pad 8 is pressed and moved in the direction indicated by the arrow C of FIGS. 7 and 8 in accordance with the wear of the lining 10, the movement of the entire biasing member 11 inside the pad guide 4 in the disc axial direction (direction indicated by the arrow C) is allowed by the upper claw portion 15A and the lower claw portion 15B as the wear-following portions.

The concave-portion facing plate portion 12B of the main body portion 12 is located at an end of the main body portion 12, which is opposite to the far-side plate portion 13 across the upper claw portion 15A. On the distal end side of the concave-portion facing plate portion 12B, the return-restricting portion 16 is formed integrally therewith. The return-restricting portion 16 is extended from the distal end side of the concave-portion facing plate portion 12B in the disc axial direction (direction indicated by the arrow B) and has a middle portion which is bent back in a U-like shape in the direction of the abutment-plate portion 12A (direction indicated by the arrow C). As illustrated in FIG. 5, a distal end portion 16A of the return restricting portion 16 is formed as a stopper part which can come into abutment against the corresponding ear portion 9A of the friction pad 8 and restricts a return position of the friction pad 8 by the pad-return portion 14.

Specifically, when the friction pad 8 is moved to the return position by the pad-return portion 14 with the release of a braking force, the distal end portion 16A of the return-restricting portion 16 comes into abutment against the outer surface of the ear portion 9A to restrict the further movement of the corresponding friction pad 8 in the direction indicated by the arrow B. When the friction pad 8 is located in the return position illustrated in FIG. 5, the friction pad 8 is elastically biased in the direction indicated by the arrow B by the pad-return portion 14 to the position at which the ear portion 9A of the friction pad 8 comes into abutment against the distal end portion 16A of the return-restricting portion 16.

The concave-portion facing plate portion 12C of the main body portion 12 is located at the end opposite to the far-side plate portion 13 across the lower claw portion 15B. On the distal end side of the concave-portion facing plate portion 12C, the radially-biasing portion 17 serving as a radial spring part is formed integrally therewith. The radially-biasing portion 17 is extended from the distal end of the concave-portion facing plate portion 12C in the disc axial direction (direction indicated by the arrow B) and has a middle portion bent back in an approximately C-like or approximately U-like shape. As a result, a distal end of the radially-biasing portion 17 is formed as an elastic extended portion 17A which extends in the direction of the abutment-plate portion 12A (direction indicated by the arrow C). The elastic extended portion 17A of the radially biasing portion 17 biases the ear portion 9A of the friction pad 8 upward from the bottom so that the ear portion 9A of the friction pad 8 is elastically interposed between the elastic extended portion 17A and each of the concave-portion facing plate portion 12B and the return-restricting portion 16.

Specifically, when the ear portion 9A of the friction pad 8 is inserted into the pad guide 4 through the biasing member 11 therebetween as illustrated in FIGS. 2 and 5, the radially-biasing portion 17 is elastically deformed so as to be interposed between the ear portion 9A of the friction pad 8 and the lower wall surface 4B of the pad guide 4. In this state, the elastic extended portion 17A of the radially-biasing portion 17 and the concave-portion facing plate portion 12B (return-restricting portion 16) sandwich the ear portion 9A from both radial sides of the disc rotor 1 so as to prevent the friction pad 8 from rattling in the disc radial direction with respect to the mounting member 2. The elastic extended portion 17A and the concave-portion facing plate portion 12B function as guiding portions for guiding the ear portion 9A of the friction pad 8 slidably in the disc axial direction.

The disc brake apparatus according to this embodiment has the configuration described above. Next, an operation of the disc brake apparatus is described.

First, when the braking operation of the vehicle is performed, a brake hydraulic pressure is supplied to the inner leg portion 6A (cylinder) of the caliper main body 6 to displace the piston 7 toward the disc rotor 1 in a sliding fashion. In this manner, the friction pad 8 on the inner side is pressed against one side surface of the disc rotor 1. At this time, the caliper main body 6 is subjected to a pressing reaction force from the disc rotor 1. Therefore, the entire caliper main body 6 displaces in a sliding fashion toward the inner side with respect to the arms 2A of the mounting member 2 so that the outer leg portion 6C presses the friction pad 8 on the outer side against the other side surface of the disc rotor 1.

As a result, the friction pad 8 on the inner side and the friction pad 8 on the outer side can firmly sandwich the disc rotor 1 which is rotating in the direction indicated by the arrows A in FIG. 1 (when the vehicle moves forward) from both axial sides. In this manner, a braking force can be applied to the disc rotor 1. When the braking operation is released, the supply of the hydraulic pressure to the piston 7 is stopped. As a result, the friction pad 8 on the inner side and the friction pad 8 on the outer side separate away from the disc rotor 1 to return to a non-braking state again.

At this time, the pad-return portion 14 of each of the biasing members 11 biases the corresponding ear portion 9A of each of the friction pads 8 in the direction indicated by the arrow B illustrated in FIG. 5 so that the ear portion 9A comes into abutment against the distal end portion 16A of the return-restricting portion 16. Specifically, when each of the friction pads 8 is moved to the return position by the pad-return portion 14 with the release of the braking force, the ear portion 9A comes into abutment against the distal end portion 16A of the return-restricting portion 16 to restrict the return position. On the other hand, when the braking operation of the vehicle is performed, each of the friction pads 8 is pressed by the caliper main body 6 to move in the disc axial direction (direction indicated by the arrow C illustrated in FIG. 6). With the movement of the friction pad 8, the pad-return portion 14 of the biasing member 11 is elastically flexurally deformed as illustrated in FIG. 6.

Each of the ear portions 9A of the friction pads 8 is slidably inserted into the pad guide 4 on the side of each of the arms 2A of the mounting member 2 through an intermediation of the biasing member 11, and is elastically biased outward in the radial direction of the disc by the elastic extended portion 17A of the radially biasing portion 17 toward the concave-portion facing plate portion 12B (return-restricting portion 16). Therefore, the rattling of the friction pads 8 in the radial direction of the disc rotor 1 due to vibrations occurring when the vehicle runs can be restricted by the radially-biasing portions 17 of the biasing members 11. Then, when the braking operation is performed, the friction pad 8 on the inner side and the friction pad 8 on the outer side can be smoothly guided in the disc axial direction inside the pad guides 4 while each of the ear portions 9A of the friction pads 8 is maintained to be interposed between the return-restricting portion 16 and the radially-biasing portion 17.

The lining 10 of each of the friction pads 8 is gradually worn away by the repeated braking operations. Therefore, the biasing member 11 is required to be movable in the disc axial direction within the pad guide 4 with the wear of the lining 10. In addition, when the braking operation is released, each of the ear portions 9A of the friction pads 8 is required to be returned to the position of the return-restricting portion 16 by the pad-return portion 14 so as to eliminate a problem of brake drag.

Therefore, according to the first embodiment, for the abutment-plate portion 12A of the main body portion 12 of the biasing means 11 which faces the disc rotor 1 in the axial direction, the upper claw portion 15A and the lower claw portion 15B are formed so as to be located separately above and below the pad-return portion 14. The claw portions 15A and 15B are configured to be respectively mounted in the upper groove portion 5A and the lower groove portion 5B of the pad guide 4 in an elastically deformed state with the interference. Specifically, the upper claw portion 15A of the biasing member 11 is abutted against the upper groove portion 5A of the pad guide 4 with a frictional resistance, whereas the lower claw portion 15B is abutted against the lower groove portion 5B with a frictional resistance.

Therefore, while the pad-return portion 14 is in a flexurally deformed state as illustrated in FIGS. 5 and 6, the biasing member 11 can be retained in the illustrated position in accordance with the frictional resistance generated by the upper claw portion 15A and the lower claw portion 15B so as to suppress the movement of the biasing member 11 in the disc axial direction inside the pad guide 4. On the other hand, when the lining 10 of each of the friction pads 8 is worn away, each of the friction pads 8 is greatly pressed and moved by the caliper main body 6 in the disc axial direction (direction indicated by the arrow C in FIG. 7) by the amount of wear to the position at which the lining 10 comes into abutment against the surface of the disc rotor 1.

As a result, the pad-return portion 14 is greatly flexurally deformed as illustrated in FIG. 7, and hence the inner surface of each of the ear portions 9A is elastically deformed by the amount equal to or larger than a predetermined deflection amount to a position at which the inner surface of each of the ear portions 9A comes into direct abutment against the abutment-plate portion 12A. Then, when the pad-return portion 14 is elastically deformed by the amount equal to or larger than the predetermined deflection amount as described above, as illustrated in FIG. 8, the biasing member 11 can be moved in the disc axial direction (direction indicated by the arrow C) inside the pad guide 4 regardless of the biasing force applied by the upper claw portion 15A and the lower claw portion 15B (frictional resistance against the upper groove portion 5A and the lower groove portion 5B).

As a result, while the braking operation is repeated, the lining 10 of each of the friction pads 8 is worn away. When each of the friction pads 8 is pressed to be moved in the direction indicated by the arrow C illustrated in FIGS. 7 and 8 in accordance with the wear of the lining 10, the movement of the entire biasing member 11 in the disc axial direction (direction indicated by the arrow C) inside the pad guide 4 can be allowed by the upper caw portion 15A and the lower claw portion 15B serving as the wear-following portions.

Therefore, according to the first embodiment, when the braking operation is released, each of the ear portions 9A of the friction pads 8 can be returned to the position of the return-restricting portion 16 by the pad-return portion 14. As a result, the dragging of the friction pads 8, which occurs while the vehicle is running, can be eliminated. Moreover, the amount of return of each of the friction pads 8 can be maintained to be constant. Therefore, a pedal feel on the brake pedal side can be improved.

In addition, the upper claw portion 15A and the lower claw portion 15B, each serving as the wear-following portion, and the pad-return portion 14 are formed of two types of spring parts, which are provided to the abutment-plate portion 12A of the biasing member 11 so as to be separated apart from each other. Therefore, the wear-following function and the pad-return function of the biasing member 11 can be performed separately. Accordingly, the wear of the pad-return portion 14, the upper claw portion 15A, and the lower claw portion 15B respectively forming the spring parts can be suppressed to improve durability and a lifetime.

Moreover, when, for example, the release of a parking brake, which is not accompanied by the operation of the brake pedal, is performed, rollback by the piston seal 7A cannot be expected because of an insufficient amount of elastic deformation of the piston seal 7A. Even in this state, the friction pad 8 on the inner side can be returned to the position of the return-restricting portion 16 by the pad-return portion 14 of the biasing member 11 so that the friction pad 8 on the inner side can be separated apart from the disc rotor 1 with the piston 7 on the caliper main body 6 side. As a result, the dragging of the friction pads 8 can be prevented.

Moreover, by providing the biasing members 11 described above on the inner side and the outer side, the friction pad 8 on the inner side and the friction pad 8 on the outer side can be separated apart from the disc rotor 1 with the same clearance therebetween. Therefore, the entire caliper main body 6 can be centered with respect to the disc rotor 1 to improve noise and vibration (NV) characteristic such as a judder. Further, even under the conditions where an lateral acceleration acts on the vehicle along with a steering operation and the like, the movement of the friction pads 8 which are subjected to the lateral acceleration can be suppressed by the biasing members 11. Therefore, the respective clearances between the disc rotor 1 and the friction pads 8 can be ensured.

Further, in the case of the floating type caliper main body 6 illustrated in FIG. 1, by setting the amount of return of each of the friction pads 8 (specifically, the amount of return for returning each of the friction pads 8 to the position of each of the return-restricting portions 16 by the pad-return portions 14 of the biasing members 11) larger than the amount of rollback of the piston seal 7A, the spring force of the biasing members 11 can be exerted on the caliper main body 6 through the friction pads 8. In this manner, an unstable behavior of the caliper main body 6 is prevented. As a result, rattling noise can be reduced.

Figure 9:
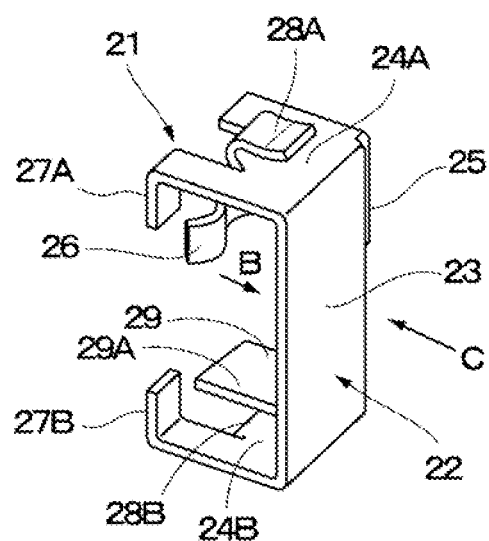
FIG. 9 is a perspective view illustrating a biasing member according to a second embodiment.
Figure 10:
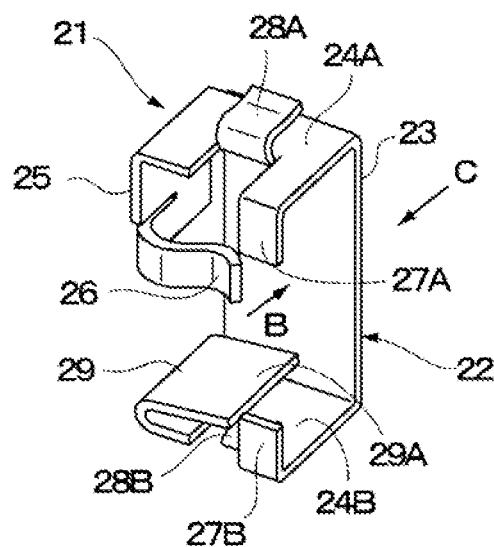
FIG. 10 is a perspective view illustrating the biasing member as viewed from a direction different from that of FIG. 9.

Next, FIGS. 9 and 10 illustrate a second embodiment. The second embodiment is characterized by a configuration in which each of the ear portions of the friction pads is brought into surface contact with the return-restricting portion of a corresponding one of the biasing members over a wider area so that the attitudes of the friction pads at the pad return positions are stabilized. In the second embodiment, the same components as those of the first embodiment described above are denoted by the same reference symbols, and the description thereof is herein omitted.

In FIGS. 9 and 10, a biasing member 21 used in the second embodiment is illustrated. The biasing member 21 is configured in approximately the same manner as the biasing member 11 described in the first embodiment. However, a main body portion 22 of the biasing member 21 includes a return-restricting portion 23, an upper concave-portion facing plate portion 24A, and a lower concave-portion facing plate portion 24B, and is formed to have a U-like shape as a whole by bending. Similarly to the concave-portion facing plate portions 12B and 12C described in the first embodiment, the upper concave-portion facing plate portion 24A and the lower concave-portion facing plate portion 24B are provided to face each other so that the upper concave-portion facing plate portion 24A is held in surface contact with the upper wall surface 4A of the pad guide 4 which is the concave portion and the lower concave-portion facing plate portion 24B is held in surface contact with the lower wall surface 4B.

Specifically, the upper concave-portion facing plate portion 24A is bent at an upper end of the return-restricting portion 23 into an approximately L-like shape. At a distal end of the upper concave-portion facing plate portion 24A, an abutment-plate portion 27A described below is formed integrally therewith. The lower concave-portion facing plate portion 24B is bent at a lower end of the return-restricting portion 23 into an approximately L-like shape. At a distal end of the lower concave-portion facing plate portion 24B, an abutment-plate portion 27B described below is formed integrally therewith.

Similarly to the return-restricting portion 16 described in the first embodiment, the return-restricting portion 23 is formed as a stopper part which can come into abutment against a corresponding one of the ear portions 9A of the friction pads 8 so as to restrict the return position of a corresponding one of the friction pads 8 by a pad-return portion 26 described below. However, the return-restricting portion 23 of the second embodiment is formed as a flat-surface portion extending in the vertical direction between the upper concave-portion facing plate portion 24A and the lower concave-portion facing plate portion 24B (specifically, between the upper wall surface 4A and the lower wall surface 4B of the pad guide 4) to constitute a rotor-facing plate portion which is provided at the position at which the return-restricting portion 23 faces the surface of the disc rotor 1 in the disc axial direction.

A far-side plate portion 25 is formed so as to be bent downward at a right angle into an L-like shape from the upper concave-portion facing plate portion 24A. Approximately similarly to the far-side plate portion 13 described in the first embodiment, the far-side plate portion 25 is formed as a flat-surface portion which is brought into abutment against the far-side wall surface 4C of the pad guide 4 while being held in surface contact therewith. On a lower side of the far-side plate portion 25, the pad-return portion 26 serving as a first spring part is formed so as to be bent at an angle inwardly in the disc axial direction, as illustrated in FIG. 10. Similarly to the pad-return portion 14 described in the first embodiment, the pad-return portion 26 biases a corresponding one of the friction pads 8 in the direction indicated by the arrow B toward the position away from the disc rotor 1 (return position), and therefore elastically comes into abutment against the ear portion 9A of the friction pad 8 from the inner side.

An upper abutment-plate portion 27A is formed at a distal end of the concave-portion facing plate portion 24A into an L-like shape by being bent into an L-like shape and a lower abutment-plate portion 27B is formed at a distal end of the concave-portion facing plate portion 24B by being bent into an L-like shape so that the upper abutment-plate portion 27A and the lower abutment-plate portion 27B come closer to each other in the disc radial direction. Each of the abutment-plate portions 27A and 27B has the same functions as those of the abutment-plate portions 12A described in the first embodiment. Specifically, when the pad-return portion 26 is greatly flexurally deformed in the direction indicated by the arrow C illustrated in FIGS. 9 and 10, each of the ear portions 9A of the friction pads 8 comes into direct abutment against the abutment-plate portions 27A and 27B.

The upper abutment-plate portion 27A is provided at the end of the upper concave-portion facing plate portion 24A, which is on the side opposite to the far-side plate portion 25 through the upper claw portion 28A therebetween. A distal end of the pad-return portion 26 is located below a lower end of the abutment plate portion 27A. The lower abutment-plate portion 27B is provided at a position of the lower concave-portion facing plate portion 24B, at which the abutment-plate portion 27B faces the upper abutment-plate portion 27A in the disc radial direction. A radially-biasing portion 29 described below is provided at the position of the lower concave-portion facing plate 24B, which is located between the return-restricting portion 23 and the abutment-plate portion 27B.

The abutment-plate portions 27A and 27B constitute a rotor facing-plate portion which is located at the position at which the abutment-plate portions 27A and 27B face the surface of the disc rotor 1 in the disc axial direction, as in the case of the return-restricting portion 23. Specifically, the biasing member 21 covers a corresponding one of the ear portions 9A of the friction pads 8 with the return-restricting portion 23 and the abutment-plate portions 27A and 27B from the disc axial direction and is locked in an elastically deformed state inside the pad guide 4 by claw portions 28A and 28B described below and the like.

The upper claw portion 28A serving as the second spring part (wear-following portion) is provided so as to extend from the upper concave-portion facing plate portion 24A of the main body portion 22. The upper claw portion 28A is formed by bending a middle portion of the concave-portion facing plate portion 24A back upward at an angle into an approximately L-like shape. The lower claw portion 28B, similarly serving as the second spring part (wear-following portion), is provided so as to extend from the lower concave-portion facing plate portion 24B of the main body portion 22. The lower claw portion 28B is formed by bending a middle portion of the concave-portion facing plate portion 24B back downward at an angle into an approximately L-like shape.

The upper claw portion 28A and the lower claw portion 28B have the same functions as those of the claw portions 15A and 15B described in the first embodiment. Specifically, while the braking operation is repeated, the lining 10 of each of the friction pads 8 is worn away. When each of the friction pads 8 is pressed to be moved in the direction indicated by the arrow C in accordance with the wear of the linings 10, the movement of the entire biasing member 21 in the disc axial direction (direction indicated by the arrow C) inside the pad guide 4 is allowed by the upper claw portion 28A and the lower claw portion 28B as the wear-following portions.

The radially-biasing portion 29 serving as a radial spring part is provided to the concave-portion facing plate portion 24B located at the lower portion of the main body portion 22 so as to be integral with the end of the concave-portion facing plate portion 24B, which is on the side opposite to the abutment-plate portion 27B through the lower claw portion 28B therebetween. The radially-biasing portion 29 has the same functions as those of the radially-biasing portion 17 described in the first embodiment, and therefore prevents a corresponding one of the friction pads 8 from rattling in the disc radial direction with respect to the mounting member 2.

However, the radially-biasing portion 29 is formed by being bent at the end of the concave-portion facing plate portion 24B upward at an angle (at an angle outwardly in the disc radial direction) from the outer side toward the inner side in the disc circumferential direction into an approximately C-like shape or an approximately U-like shape. A distal end of the radially-biasing portion 29 is formed as an elastic extended portion 29A extending toward the abutment-plate portion 27B. The elastic extended portion 29A of the radially-biasing portion 29 biases a corresponding one of the ear portions 9A of the friction pads 8 upward from the lower side so as to elastically hold the corresponding ear portion 9A of the friction pad 8 with the concave-portion facing plate portion 24A.

As described above, even in the second embodiment configured as described above, approximately the same functions and effects as those of the first embodiment described above can be obtained. In particular, the biasing member 21 of this embodiment includes the main body portion 22 which includes the return-restricting portion 23, the upper concave-portion facing plate portion 24A, and the lower concave-portion facing plate portion 24B, and is formed to have the U-like shape as a whole by bending. Further, the return-restricting portion 23 is formed as the flat-surface portion vertically extending between the upper concave-portion facing plate portion 24A and the lower concave-portion facing plate portion 24B so as to cover a corresponding one of the ear portions 9A of the friction pads 8 from the outer side in the disc axial direction.

Therefore, when the braking operation is released to return each of the ear portions 9A of the friction pads 8 to the return position inside the pad guide 4 by the pad-return portion 26, the biasing member 21 can bring the ear portion 9A into surface contact with the return-restricting portion 23 over a wide area. Accordingly, the attitude of each of the friction pads 8 at the pad return position can be stabilized by the return-restricting portion 23.

Figure 11:
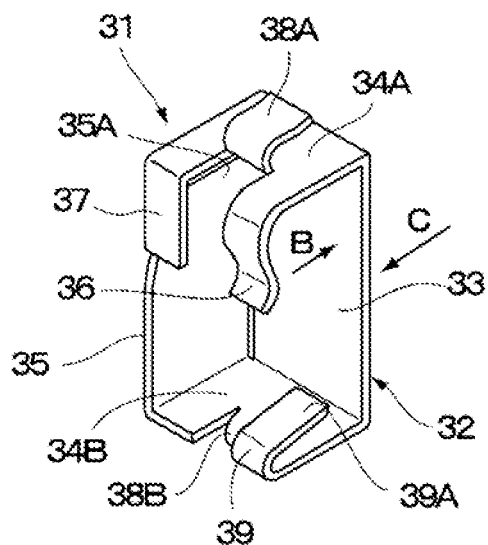
FIG. 11 is a perspective view illustrating a biasing member according to a third embodiment.
Figure 12:
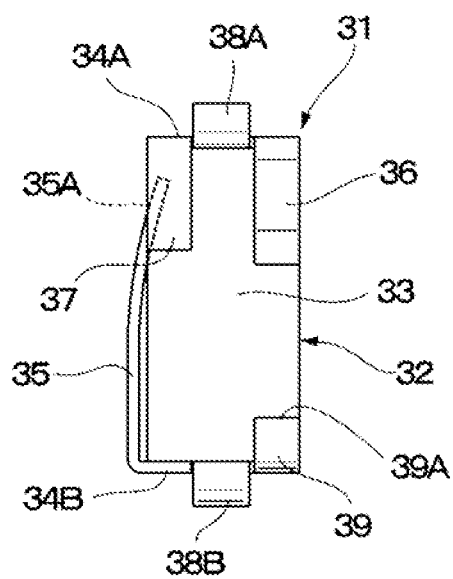
FIG. 12 is a side view of the biasing member illustrated in FIG. 11.

Next, FIGS. 11 and 12 illustrate a third embodiment. The third embodiment is characterized by a configuration in which a circumferential spring part for biasing a corresponding one of the ear portions of the friction pads to the disc-outgoing side in the circumferential direction of the disc is provided to the biasing member. Also in the third embodiment, the same components as those of the first embodiment described above are denoted by the same reference symbols, and the description thereof is herein omitted.

In FIGS. 11 and 12, a biasing member 31 used in the third embodiment is illustrated. The biasing member 31 is configured in approximately the same manner as the biasing member 11 described in the first embodiment. However, a main body portion 32 of the biasing member 31 includes a return-restricting portion 33, an upper concave-portion facing plate portion 34A, and a lower concave-portion facing plate portion 34B, and is formed to have a U-like shape as a whole by bending. Similarly to the concave-portion facing plate portions 12B and 12C described in the first embodiment, the upper concave-portion facing plate portion 34A and the lower concave-portion facing plate portion 34B are provided to face each other so that the upper concave-portion facing plate portion 34A is held in surface contact with the upper wall surface 4A of the pad guide 4 which is the concave portion and the lower concave-portion facing plate portion 34B is held in surface contact with the lower wall surface 4B of the pad guide 4.

Specifically, the upper concave-portion facing plate portion 34A is bent at an upper end of the return-restricting portion 33 into an approximately L-like shape. At a distal end of the upper concave-portion facing plate portion 34A, a pad-return portion 36 and an abutment-plate portion 37 described below are each formed integrally therewith. The lower concave-portion facing plate portion 34B is bent at a lower end of the return-restricting portion 33 into an approximately L-like shape. At a distal end of the lower concave-portion facing plate portion 34B, a radially-biasing portion 39 described below is formed integrally therewith.

Similarly to the return-restricting portion 16 described in the first embodiment, the return-restricting portion 33 is formed as a stopper part which can come into abutment against a corresponding one of the ear portions 9A of the friction pads 8 so as to restrict the return position of a corresponding one of the friction pads 8 by a pad-return portion 36 described below. However, the return-restricting portion 33 of the third embodiment is formed as a flat-surface portion extending in the vertical direction between the upper concave-portion facing plate portion 34A and the lower concave-portion facing plate portion 34B (specifically, between the upper wall surface 4A and the lower wall surface 4B of the pad guide 4) to constitute a rotor-facing plate portion which is provided at the position at which the return-restricting portion 33 faces the surface of the disc rotor 1 in the disc axial direction.

A far-side plate portion 35 is formed so as to be bent upward toward the upper concave-portion facing plate portion 34A into an L-like shape from the lower concave-portion facing plate portion 34B. Approximately similarly to the far-side plate portion 13 described in the first embodiment, the far-side plate portion 35 is brought into abutment against the far-side wall surface 4C of the pad guide 4 while being held in surface contact therewith. However, an upper part of the far-side plate portion 35 of this embodiment is formed as a circumferential spring part 35A which is curved in an arc-like shape as indicated by a dotted line in FIG. 12.

Specifically, the biasing member 31 used in the third embodiment is provided between the arm 2A (pad guide 4), which is located, for example, on the disc-incoming side, of the two arms 2A of the mounting member 2, illustrated in FIG. 1, and a corresponding one of the ear portions 9A of the friction pads 8. In this manner, the biasing member 31 on the disc-incoming side constantly biases one of the ear portions 9A of each of the friction pads 8, which is located on the disc-incoming side, toward the disc-outgoing side of the disc rotor 1 (in the direction indicated by the arrow A illustrated in FIG. 1) with a weak force by the circumferential spring part 35A provided to the far-side plate portion 35. Then, each of the ear portions 9A located on the disc-outgoing side of the disc rotor 1 is elastically pressed against the ear-side wall surface 4C of the pad guide 4 by a biasing force of the circumferential spring part 35A.

In this case, for example, the biasing member 21 described in the second embodiment and illustrated in FIGS. 9 and 10 may be provided between the arm 2A (pad guide 4) of the two arms 2A of the mounting member 2, which is located on the disc-outgoing side, and a corresponding one of the ear portions 9A of the friction pads 8. Moreover, a biasing member, which is approximately similar to the biasing member 31 except that the circumferential spring part 35A is not provided to the far-side plate portion 35, may be provided.

The pad-return portion 36 serving as the first spring part is extended integrally from an end of the upper concave-portion facing plate portion 34A of the main body portion 32 of the biasing member 31, which is on the side opposite to an abutment-plate portion 37 through an upper claw portion 38A described below therebetween. The pad-return portion 36 is formed at a distal end of the concave-portion facing plate portion 34A so as to be bent at an angle inwardly in the disc radial direction. Similarly to the pad-return portion 14 described in the first embodiment, the pad-return portion 36 is elastically held in abutment against a corresponding one of the ear portions 9A of the friction pads 8 from the inner side so as to bias the friction pad 8 in the direction indicated by the arrow B to the position separated apart from the disc rotor 1 (return position).

The abutment-plate portion 37 is formed at the distal end of the upper concave-portion facing plate portion 34A by being bent inward in the disc radial direction (downward) into an L-like shape. The abutment-plate portion 37 has the same functions as those of the abutment-plate portion 12A described in the first embodiment. Specifically, when the pad-return potion 36 is greatly flexurally deformed in the direction indicated by the arrow C illustrated in FIGS. 11 and 12, a corresponding one of the ear portions 9A of the friction pads 8 comes into direct abutment against the abutment-plate portion 37.

The abutment-plate portion 37 constitutes a rotor facing-plate portion which is located at the position at which the abutment-plate portion 37 faces the surface of the disc rotor 1 in the disc axial direction, as in the case of the return-restricting portion 33. Specifically, the biasing member 31 covers a corresponding one of the ear portions 9A of the friction pads 8 with the return-restricting portion 33 and the abutment-plate portion 37 from the disc axial direction and is locked in an elastically deformed state inside the pad guide 4 by claw portions 38A and 38B described below.

The upper claw portion 38A serving as the second spring part (wear-following portion) is provided so as to extend from the upper concave-portion facing plate portion 34A of the main body portion 32. The upper claw portion 38A is formed by bending a middle portion of the concave-portion facing plate portion 34A, which is positioned between the pad-return portion 36 and the abutment-plate portion 37, back upward at an angle into an approximately L-like shape. The lower claw portion 38B, similarly serving as the second spring part (wear-following portion), is provided so as to extend from the lower concave-portion facing plate portion 34B of the main body portion 32. The lower claw portion 38B is formed by bending a middle portion of the concave-portion facing plate portion 34B back downward at an angle into an approximately L-like shape.

The upper claw portion 38A and the lower claw portion 38B have the same functions as those of the claw portions 15A and 15B described in the first embodiment. Specifically, while the braking operation is repeated, the lining 10 of each of the friction pads 8 is worn away. When each of the friction pads 8 is pressed to be moved in the direction indicated by the arrow C in accordance with the wear of the linings 10, the movement of the entire biasing member 31 in the disc axial direction (direction indicated by the arrow C) inside the pad guide 4 is allowed by the upper claw portion 38A and the lower claw portion 38B as the wear-following portions.

The radially-biasing portion 39 serving as a radial spring part is provided to the concave-portion facing plate portion 34B located at the lower portion of the main body portion 32 so as to be integral with the end of the concave-portion facing plate portion 34B, which is on the side opposite to the far-side plate portion 35 through the lower claw portion 38B therebetween. The radially-biasing portion 39 has the same function as those of the radially-biasing portion 17 described in the first embodiment, and therefore prevents a corresponding one of the friction pads 8 from rattling in the disc radial direction with respect to the mounting member 2.

However, the radially-biasing portion 39 is formed by being bent at the distal end of the concave-portion facing plate portion 34B upward at an angle (at an angle outwardly in the disc radial direction) from the outer side toward the inner side in the disc axial direction into an approximately C-like shape or an approximately L-like shape. A distal end of the radially-biasing portion 39 is formed as an elastic extended portion 39A extending toward the return-restricting portion 33. The elastic extended portion 39A of the radially-biasing portion 39 biases a corresponding one of the ear portions 9A of the friction pads 8 upward from the lower side so as to elastically hold the corresponding ear portion 9A of the friction pad 8 with the concave-portion facing plate portion 34A.

As described above, even in the third embodiment having the configuration described above, approximately the same functions and effects as those of the first embodiment described above can be obtained. Moreover, the return-restricting portion 33 of the biasing member 31 is formed as a flat-surface portion vertically extending between the upper concave-portion facing plate portion 34A and the lower concave-portion facing plate portion 34B so as to cover a corresponding one of the ear portions 9A of the friction pads 8 from the outer side in the disc axial direction. Therefore, the same effects as those provided by the second embodiment described above are obtained.

In addition, the biasing member 31 used in the third embodiment is configured as the biasing member on the disc-incoming side, which is provided between the arm 2A (pad guide 4) located on the disc-incoming side and a corresponding one of the ear portions 9A of the friction pads 8. The circumferential spring part 35A is provided to the far-side plate portion 35 of the biasing member 31. In this manner, the ear portion 9A of all the ear portions 9A of each of the friction pads 8, which is located on the disc-outgoing side of the disc rotor 1, is elastically pressed against the far-side wall surface 4C of the pad guide 4 by the biasing force of the circumferential spring part 35A.

Therefore, the rattling of the friction pads 8 in the circumferential direction of the disc rotor 1 due to vibrations generated while the vehicle is running can be suppressed by the biasing member 31 provided between the ear portion 9A on the disc-incoming side and the pad guide 4. Then, at the time of the braking operation performed when the vehicle moves forward, the braking torque (rotation torque in the direction indicated by the arrow A) received by the friction pads 8 from the disc rotor 1 can be borne by the arm 2A on the disc-outgoing side (far-side wall surface 4C of the pad guide 4). In this manner, a problem of abnormal noise generated by the movement of the friction pads 8, which is caused by the braking torque, can be eliminated.

Figure 13:
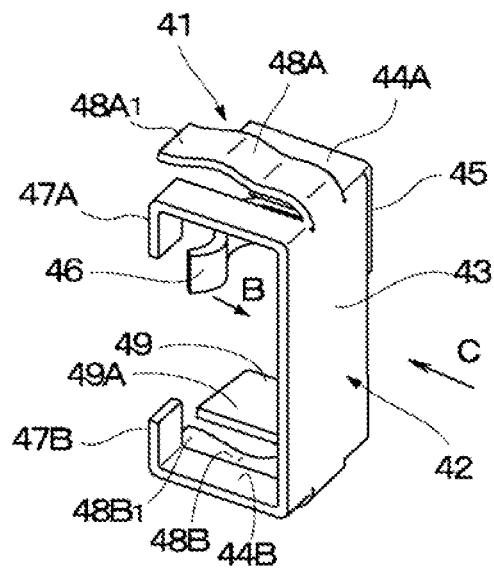
FIG. 13 is a perspective view illustrating a biasing member according to a fourth embodiment.

Next, FIG. 13 illustrates a fourth embodiment. The fourth embodiment is characterized by a configuration in which the upper claw portion and the lower claw portion, which serve as the wear-following portions of the biasing member, are extended in the direction of the disc rotor and thus the extended portions are made to function as wear-detecting portions. In the fourth embodiment, the same components as those of the first embodiment described above are denoted by the same reference symbols, and the description thereof is herein omitted.

In FIG. 13, a biasing member 41 used in the fourth embodiment is illustrated. The biasing member 41 is configured in approximately the same manner as the biasing member 21 described in the second embodiment described above. A main body portion 42 of the biasing member 41 includes a return-restricting portion 43, an upper concave-portion facing plate portion 44A, and a lower concave-portion facing plate portion 44B, and is formed by being bent into a U-like shape as a whole. However, the upper concave-portion facing plate portion 44A and the lower concave-portion facing plate portion 44B are formed with claw portions 48A and 48B described below to have different shapes from those of the concave-portion facing plate portions 24A and 24B described in the second embodiment.

Similarly to the far-side plate portion 25 described in the second embodiment, a far-side plate portion 45 is provided to the upper concave-portion facing plate portion 44A. On the lower side of the far-side plate portion 45, a pad-return portion 46 serving as the first spring part is formed. Moreover, an upper abutment-plate portion 47A, a lower abutment-plate portion 47B, and a radially-biasing portion 49 having an elastic extended portion 49A are formed in the same manner as those of the second embodiment.

The upper claw portion 48A serving as the second spring part (wear-following portion) is extended from the concave-portion facing plate portion 44A of the main body portion 42, whereas the lower claw portion 48B serving as the second spring part (wear-following portion) is extended from the concave-portion facing plate portion 44B. The upper claw portion 48A and the lower claw portion 48B are formed in approximately the same manner as the claw portions 28A and 28B described in the second embodiment. However, the upper claw portion 48A of the fourth embodiment is formed to have a large length so as to divide the concave-portion facing plate portion 44A into two at the middle position in the width direction. A base end of the upper claw portion 48A is integrated with an upper end of the return-restricting portion 43. The upper claw potion 48A is formed so as to be extended in the disc axial direction (direction indicated by the arrow C) above an upper surface of the concave-portion facing plate portion 44A. An extended end of the upper claw portion 48A is formed as a wear-detecting portion 48A1 to project in the direction indicated by the arrow C beyond the abutment-plate portion 47A.

The lower claw portion 48B is formed to have a long length so as to divide the concave-portion facing plate portion 44B into two at the middle position in the width direction. A base end of the lower claw portion 48B is integrated with a lower end of the return-restricting portion 43. Then, the lower claw portion 48B is extended in the disc axial direction (direction indicated by the arrow C) below a lower surface of the concave-portion facing plate portion 44B. The extended end of the lower claw portion 48B is formed as a wear-detecting portion 48B1 to project in the direction indicated by the arrow C beyond the abutment-plate portion 47B.

The upper claw portion 48A and the lower claw portion 48B have the same functions as those of the claw portions 15A and 15B described in the first embodiment. Specifically, while the braking operation is repeated, the lining 10 of each of the friction pads 8 is worn away. When each of the friction pads 8 is pressed to be moved in the direction indicated by the arrow C in accordance with the wear of the linings 10, the movement of the entire biasing member 41 in the disc axial direction (direction indicated by the arrow C) inside the pad guide 4 is allowed by the upper claw portion 48A and the lower claw portion 48B as the wear-following portions.

As described above, even in the fourth embodiment having the configuration described above, when the braking operation is released to return each of the ear portions 9A of the friction pads 8 to the return position inside the pad guide 4 by the pad-return portion 46, the biasing member 41 brings the ear portion 9A into surface contact with the return-restricting portion 43 over a wide area so as to stabilize the attitude of each of the friction pads 8 at the pad-return position. Therefore, approximately the same functions and effects as those provided by the second embodiment described above can be obtained.

In particular, the upper claw portion 48A and the lower claw portion 48B serving as the second spring parts (wear-following portions) are provided to the biasing member 41 of the fourth embodiment so as to extend in the disc axial direction (direction indicated by the arrow C). The respective extended ends of the upper claw portion 48A and the lower claw portion 48B are formed as the wear-detecting portions 48A1 and 48B1 projecting in the direction indicated by the arrow C beyond the abutment-plate portions 47A and 47B, respectively. Therefore, when the lining 10 of each of the friction pads 8 is worn away to a maximum wear position, the wear-detecting portion 48A1 of the upper claw portion 48A and the wear-detecting portion 48B1 of the lower claw portion 48B come into contact with the surface of the disc rotor 11 to generate abnormal noise. In this manner, the notification of the wear of the friction pads 8, that is, time to replace the friction pads 8, can be made.

Figure 14:
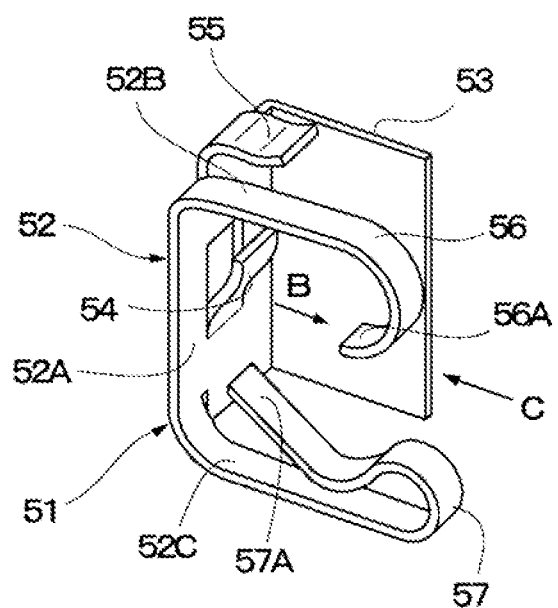
FIG. 14 is a perspective view illustrating a biasing member according to a fifth embodiment.
Figure 15:
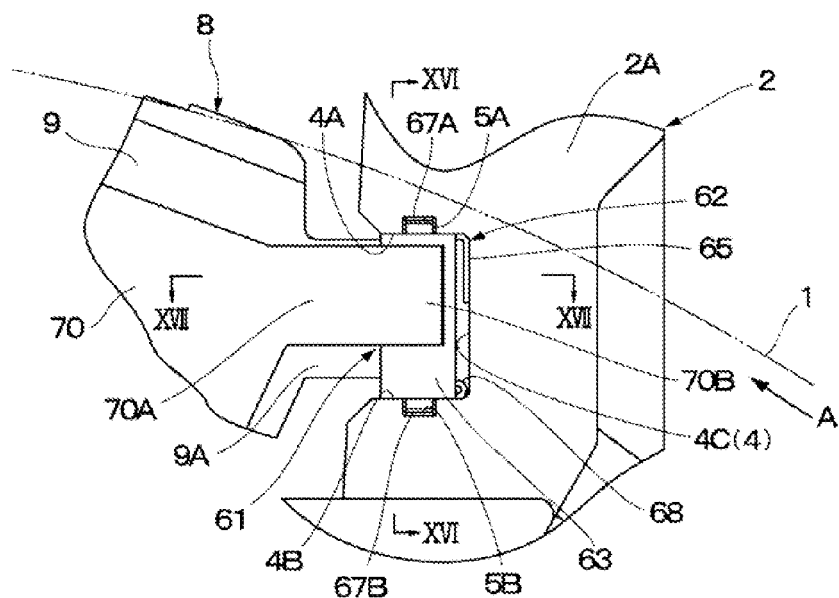
FIG. 15 is a partial front view illustrating a state in which a friction pad according to a sixth embodiment is mounted to the pad guide through an intermediation of the biasing member.

Next, FIG. 14 illustrates a fifth embodiment. The fifth embodiment is characterized by a configuration in which, instead of providing a plurality of second spring parts, only one second spring part serving as the wear-following portion of the biasing member is provided. In the fifth embodiment, the same components as those of the first embodiment described above are denoted by the same reference symbols, and the description thereof is herein omitted.

In FIG. 14, a biasing member 51 used in the fifth embodiment is illustrated. The biasing member 51 is configured in approximately the same manner as the biasing member 11 described in the first embodiment, and a main body portion 52 of the biasing member 51 includes an abutment-plate portion 52A serving as a rotor-facing plate portion, an upper concave-portion facing plate portion 52B, and a lower concave-portion facing plate portion 52C, and is formed to have a U-like shape as a whole by bending. The biasing member 51 includes a far-side plate portion 53, a pad-return portion 54 serving as the first spring part, an upper claw portion 55 serving as the second spring part (wear-following portion), a return-restricting portion 56 having a distal end portion 56A, and a radially-biasing portion 57 having an elastic extended portion 57A, which are formed in approximately the same manner as in the first embodiment.

However, the biasing member 51 of the fifth embodiment includes only the upper claw portion 55 provided to an upper end of the abutment-plate portion 52A. Specifically, the lower claw portion 15B is not provided to a lower end of the abutment-plate portion 52A, in contrast to the biasing member 11 described in the first embodiment. The upper claw portion 55 is mounted in an elastically deformed state in the upper groove portion 5A of the pad guide 4 with an interference as in the case of the upper claw portion 15A described in the first embodiment. The upper claw portion 55 abuts against the upper groove portion 5A and biases the entire biasing member 51 toward the lower wall surface 4B (lower groove portion 5B) of the pad guide 4. Further, the upper claw portion 55 biases the mounting member 2 of the caliper 100 toward the lower groove portion 5B.

Specifically, a frictional resistance of the upper claw portion 55 against the upper groove portion 5A is set larger than a spring force (biasing force) of the pad-return portion 54. However, while the braking operation is repeated, the lining 10 of each of the friction pads 8 is worn away. When each of the friction pads 8 is pressed to be moved in the direction indicated by the arrow C as exemplified in FIGS. 7 and 8 in accordance with the wear of the linings 10, the movement of the entire biasing member 51 in the disc axial direction (direction indicated by the arrow C) inside the pad guide 4 is allowed by the single upper claw portion 55 as the wear-following portion.

As described above, even in the fifth embodiment configured as described above, approximately the same functions and effects as those of the first embodiment described above can be obtained. In particular, the biasing member 51 of the fifth embodiment is configured to include the single upper claw portion 55 as the second spring part (wear-following portion). Therefore, the whole shape can be simplified to reduce material cost and fabrication cost.

Next, FIGS. 15 to 18 illustrate a sixth embodiment. The sixth embodiment is characterized in that the first spring part for biasing a corresponding one of the friction pads in a direction separating apart from the disc rotor is formed of a shim plate provided to the friction pad. In the sixth embodiment, the same components as those of the first embodiment described above are denoted by the same reference symbols, and the description thereof is herein omitted.

In FIGS. 15 to 18, a biasing member 61 used in the sixth embodiment is illustrated. The biasing member 61 includes a pad spring 62 described below and a pad-return portion 70B provided to a shin plate 70 described below. The pad spring 62 of the biasing member 61 is configured in approximately the same manner as the biasing member 21 described in the second embodiment. However, the pad spring 62 is not provided with the first spring part corresponding to the pad-return portion 26 described in the second embodiment.

The pad spring 62 includes a return-restricting portion 63, an upper concave-portion facing plate portion 64A, and a lower concave-portion facing plate portion 64B, and is formed to have a U-like shape as a whole by bending. Similarly to the concave-portion facing plate portions 12B and 12C described in the first embodiment, the upper concave-portion facing plate portion 64A is provided so as to face the upper wall surface 4A of the pad guide 4 forming the concave portion while being held in surface contact therewith, whereas the lower concave-portion facing plate portion 64B is provided so as to face the lower wall surface 4B of the pad guide 4 while being held in surface contact therewith.

Specifically, the upper concave-portion facing plate portion 64A is bent at an upper end of the return-restricting portion 63 into an approximately L-like shape. At a distal end of the concave-portion facing plate portion 64A, an abutment-plate portion 66 and an upper claw portion 67A described below are formed integrally therewith. The lower concave-portion facing plate portion 64B is bent at a lower end of the return-restricting portion 63 into an approximately L-like shape. At a distal end of the concave-portion facing plate portion 64B, only a lower claw portion 67B described below is formed integrally therewith.

Similarly to the return-restricting portion 16 described in the first embodiment, the return-restricting portion 63 is formed as a stopper part which can come into abutment against a corresponding one of the ear portions 9A of the friction pads 8 so as to restrict the return position of a corresponding one of the friction pads 8 by a pad-return portion 70B described below. However, the return-restricting portion 63 of the fifth embodiment is formed as a flat-surface portion extending vertically between the upper concave-portion facing plate portion 64A and the lower concave-portion facing plate portion 64B (specifically, between the upper wall surface 4A and the lower wall surface 4B of the pad guide 4).

A far-side plate portion 65 is formed so as to be bent downward at a right angle from the upper concave-portion facing plate portion 64A into an L-like shape. Approximately similarly to the far-side plate portion 13 described in the first embodiment, the far-side plate portion 65 is formed as a flat-surface portion which is brought into abutment against the far-side wall surface 4C of the pad guide 4 so as to be held in surface contact therewith. An abutment-plate portion 66 is formed at a distal end of the upper concave-portion facing plate portion 64A by being bent downward (inward in the disc radial direction) into an L-like shape. The abutment-plate portion 66 has the same functions as those of the abutment-plate portion 12A described in the first embodiment. Specifically, when the pad-return portion 70B is greatly flexurally deformed in the direction indicated by the arrow C, a corresponding one of the ear portions 9A of the friction pads 8 comes into direct abutment against the abutment-plate portion 66 at a position of a level-difference portion 69 described below.

The abutment-plate portion 66 is provided at an end of the upper concave-portion facing plate portion 64A, which is on the side opposite to the far-side plate portion 65 through the upper claw portion 67A therebetween. The pad spring 62 of the biasing member 61 covers a corresponding one of the ear portions 9A of the friction pads 8 with the return-restricting portion 63 and the abutment-plate portion 66 from the disc axial direction and is locked in an elastically deformed state inside the pad guide 4 by the claw portions 67A and 67B described below.

The upper claw portion 67A serving as the second spring part (wear-following portion) is extended from the upper concave-portion facing plate portion 64A of the pad spring 62. The upper claw portion 67A is formed by bending back a middle portion of the concave-portion facing plate portion 64A upward at an angle into an approximately L-like shape. The lower claw portion 67B similarly serving as the second spring part (wear-following portion) is extended from the lower concave-portion facing plate portion 64B of the pad spring 62. The lower claw portion 67B is formed by bending back a middle portion of the concave-portion facing plate portion 64B downward at an angle into an approximately L-like shape.

The upper claw portion 67A and the lower claw portion 67B have the same functions as those of the claw portions 15A and 15B described in the first embodiment. Specifically, while the braking operation is repeated, the lining 10 of each of the friction pads 8 is worn away. When each of the friction pads 8 is pressed to be moved into the direction indicated by the arrow C in accordance with the wear of the linings 10, the movement of the entire biasing member 61 in the disc axial direction (direction indicated by the arrow C) inside the pad guide 4 is allowed by the upper claw portion 67A and the lower claw portion 67B as the wear-following portions.

A radially-biasing portion 68 serving as a radial spring part is provided integrally with an end of the concave-portion facing plate portion 64B located in a lower part of the pad spring 62, which faces the far-side plate portion 63 in the vertical direction. The radially-biasing portion 68 has the same functions as those of the radially-biasing portion 17 described in the first embodiment and prevents a corresponding one of the friction pads 8 from rattling in the disc radial direction with respect to the mounting member 2.

However, the radially-biasing portion 68 is formed by being bent at the end of the concave-portion facing plate portion 64B upward at an angle (at an angle outwardly in the disc radial direction) from the outer side to the inner side in the disc circumferential direction into an approximately C-like shape or an approximately U-like shape. A distal end of the radially-biasing portion 68 is formed as an elastic extended portion 68A. The elastic extended portion 68A of the radially-biasing portion 68 biases a corresponding one of the ear portions 9A of the friction pads 8 upward from the lower side so as to elastically hold the ear portion 9A of the friction pad 8 with the concave-portion facing plate portion 64A.

Figure 17:
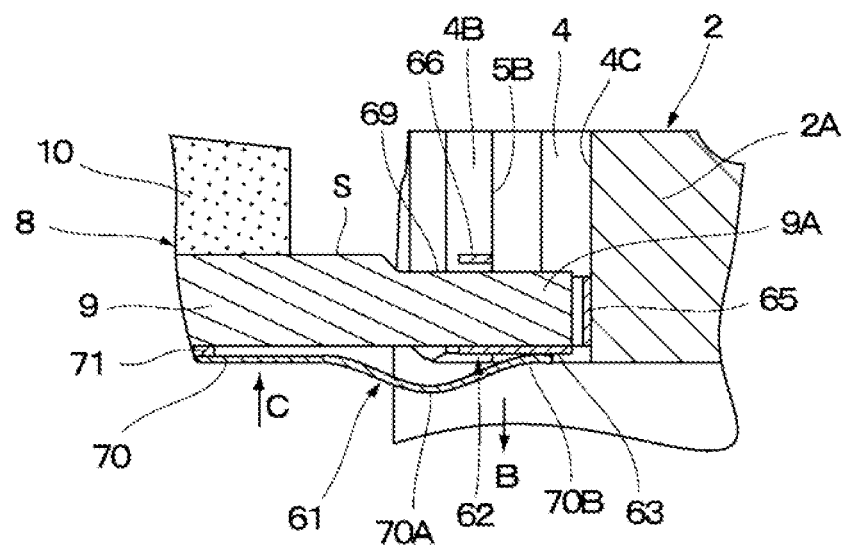
FIG. 17 is a partial sectional view illustrating the biasing member together with the friction pad, as viewed from a direction indicated by the arrow XVII-XVII of FIG. 15.
Figure 18:
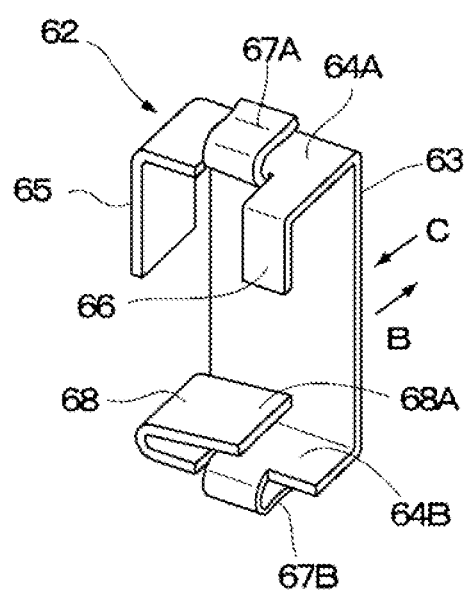
FIG. 18 is a perspective view illustrating a pad spring illustrated in FIG. 15 as a single body.

The level-difference portion 69 is formed on each of the ear portions 9A of the friction pads 8. As illustrated in FIG. 17, the level-difference portion 69 is formed by reducing a thickness of the ear portion 9A on the inner surface side. Therefore, the position at which the level-difference portion 69 comes into contact with the abutment-plate portion 66 of the pad spring 62 can be shifted in the direction indicated by the arrow B so as be lower than a joint surface S (see FIG. 17) between the back plate 9 and the lining 10. Therefore, for example, when the lining 10 of each of the friction pads 8 is worn away to the maximum extent, the abutment-plate portion 66 of the pad spring 62 can be prevented from coming into contact with the disc rotor 1.

The shim plate 70 is provided to each of the friction pads 8 so as to prevent brake squeal. The shim plate 70 is removably provided on a surface of the back plate 9 of each of the friction pads 8, which is on the side opposite to the lining 10. Specifically, the shim plate 70 is fixed to the back plate 9 at the position of a joint portion 71 by using means such as a bolt, a screw member, or caulking, as illustrated in FIG. 17. Therefore, when the braking operation of the vehicle is performed, the shim plate 70 is pressed to be moved in the direction indicated by the arrow C together with the back plate 9 of each of the friction pads 8. When the braking operation is released, the shim plate 70 is moved in the direction indicated by the arrow B.

Spring-plate portions 70A (only one thereof is illustrated) are provided on both ends of the shim plate 70 extending in the disc circumferential direction. Each of the spring-plate portions 70A extends along the ear portion 9A of the back plate 9. A distal end (free end) of each of the spring-plate portions 70A is formed as a pad-return portion 70B serving as the first spring part. The spring-plate portion 70A is formed to be curved in a mountain-like shape so that a middle portion thereof is separated apart from the ear portion 9A of the back plate 9 in the direction indicated by the arrow B, as illustrated in FIG. 17. The pad-return portion 70B on the distal end side is held in abutment against the return-restricting portion 63 of the pad spring 62 in an elastically deformed state (state in which an initial deflection is applied).

When the braking operation of the vehicle is performed, the shim plate 70 is pressed to be moved in the direction indicated by the arrow C together with the back plate 9 of each of the friction pads 8. The ear portion 9A is separated apart from the return-restricting portion 63 of the pad spring 62 so as to be moved to the position at which the level-difference portion 69 comes closer to (or comes into abutment against) the abutment-plate portion 66. However, the pad spring 62 remains in the position, for example, illustrated in FIGS. 16 and 17. Thus, the pad-return portion 70B remains in the illustrated position while being held in abutment against the return-restricting portion 63. Therefore, when the braking operation is released, a spring force is generated so as to return the entire friction pad 8 in the direction indicated by the arrow B by the spring plate portions 70A of the shim plate 70. As a result, each of the friction pads 8 is biased in the direction indicated by the arrow B toward the position away from the disc rotor 1 (return position).

On the other hand, when the lining 10 of each of the friction pads 8 is worn away, the friction pad 8 is greatly pressed to be moved in the disc axial direction (direction indicated by the arrow C illustrated in FIGS. 16 and 17) by the amount of wear by the caliper main body 6 to the position at which the lining 10 comes into abutment against the surface of the disc rotor 1. As a result, the level-difference portion 69 of the ear portion 9A comes into direct abutment against the abutment-plate portion 66 so as to press the pad spring 62 in the direction indicated by the arrow C. When the pressing force at this time exceeds the biasing force generated by the upper claw portion 67A and the lower claw portion 67B (frictional resistance force against the upper groove portion 5A and the lower groove portion 5B), the entire pad spring 62 gradually moves in the disc axial direction (direction indicated by the arrow C) inside the pad guide 4.

Figure 16:
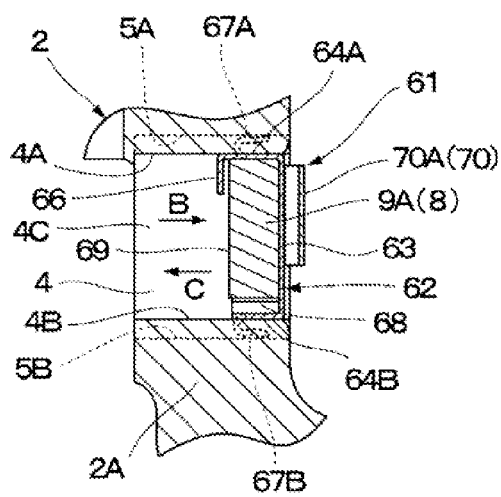
FIG. 16 is a partial sectional view illustrating the biasing member together with an ear portion of the friction pad, as viewed from a direction indicated by the arrow XIV-XIV of FIG. 15.

As a result, when the lining 10 of each of the friction pads 8 is worn away while the braking operation is repeated and the friction pad 8 is pressed to be moved in the direction indicated by the arrow C illustrated in FIGS. 16 and 17 in accordance with the wear, the movement of the entire pad spring 62 in the disc axial direction (direction indicated by the arrow C) inside the pad guide 4 is allowed by the upper claw portion 67A and the lower claw portion 67B as the wear-following portions.

As described above, even in the sixth embodiment configured as described above, approximately the same functions and effects as those of the first embodiment described above can be obtained. Specifically, when the braking operation is released, the ear portion 9A of the friction pad 8 can be returned to the position of the return-restricting portion 63 by the pad-return portions 70B provided to the shim plate 70. Therefore, the dragging of the friction pads 8 while the vehicle is running can be prevented.

In addition, the upper claw portion 67A and the lower claw portion 67B serving as the wear-following portions and the pad-return portions 70B of the shim plate 70 are respectively formed of two types of spring pieces which are different from each other. The wear-following function and the pad-return function of the biasing member 61 can be performed as separate functions. Therefore, the wear of the upper claw portion 67A, the lower claw portion 67B, and the pad-return portion 70B constituting the respective spring pieces is suppressed to improve the durability and the lifetime.

Further, in the sixth embodiment, the level-difference portion 69 is formed on the inner surface of each of the ear portions 9A of the friction pads 8. The position, at which the level-difference portion 69 comes into contact with the abutment-plate portion 66 of the pad spring 62, is shifted in the direction indicated by the arrow B so as to be lower than the joint surface S (see FIG. 17) between the back plate 9 and the lining 10. Therefore, for example, when the lining 10 of each of the friction pads 8 is worn away to the maximum extent, the abutment-plate portion 66 of the pad spring 62 can be prevented from coming into contact with the disc rotor 1. Therefore, the friction pads 8 can be used until the friction pads 8 are fully worn away. Note that, the level-difference portion 69 similar to that in the sixth embodiment may be provided to the ear portion of each of the friction pads of other embodiments.

Figure 19:
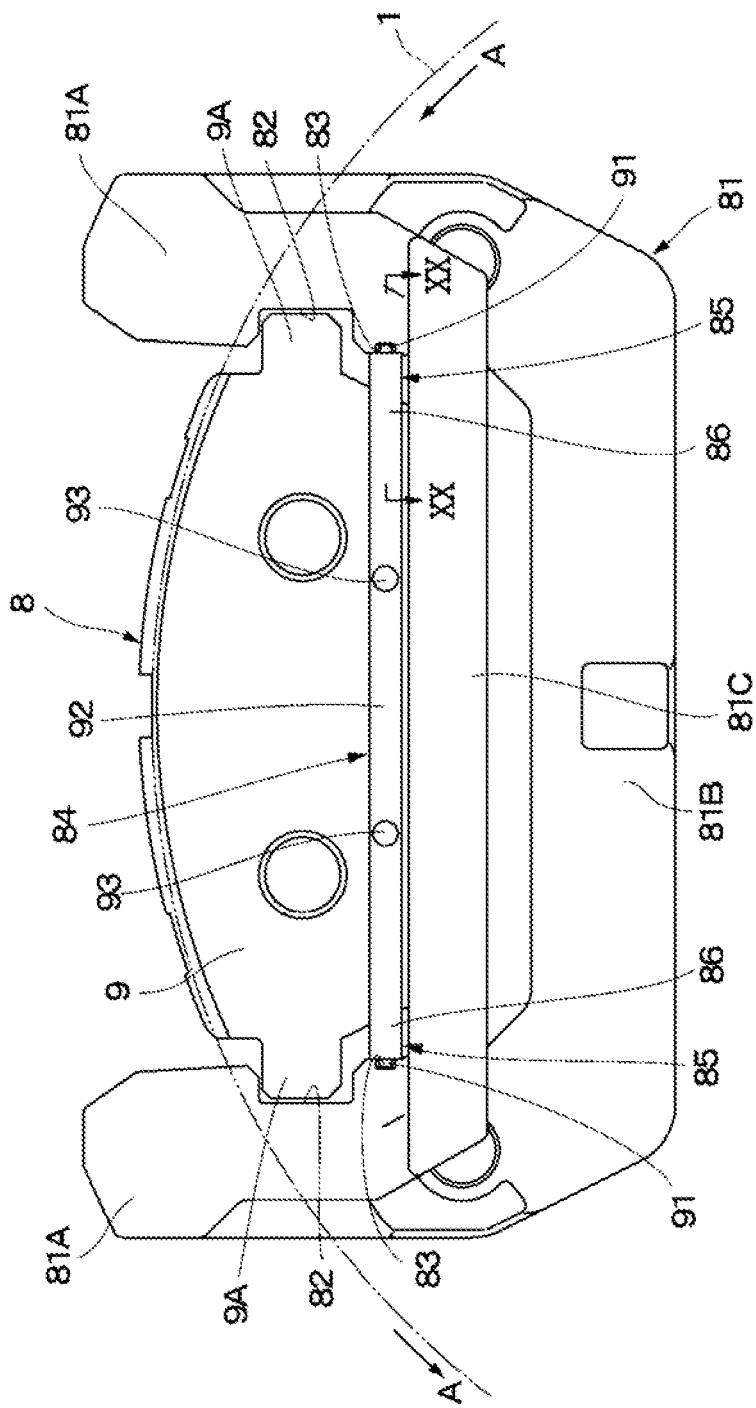
FIG. 19 is a front view illustrating a disc brake apparatus according to a seventh embodiment in a state in which a caliper main body is removed therefrom.
Figure 20:
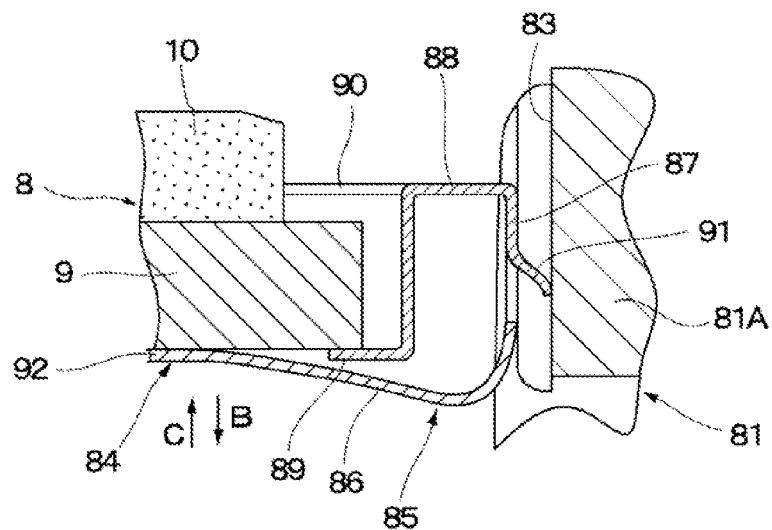
FIG. 20 is a partial sectional view illustrating a biasing member together with a friction pad, as viewed from a direction indicated by the arrow XX-XX of FIG. 19.
Figure 21:
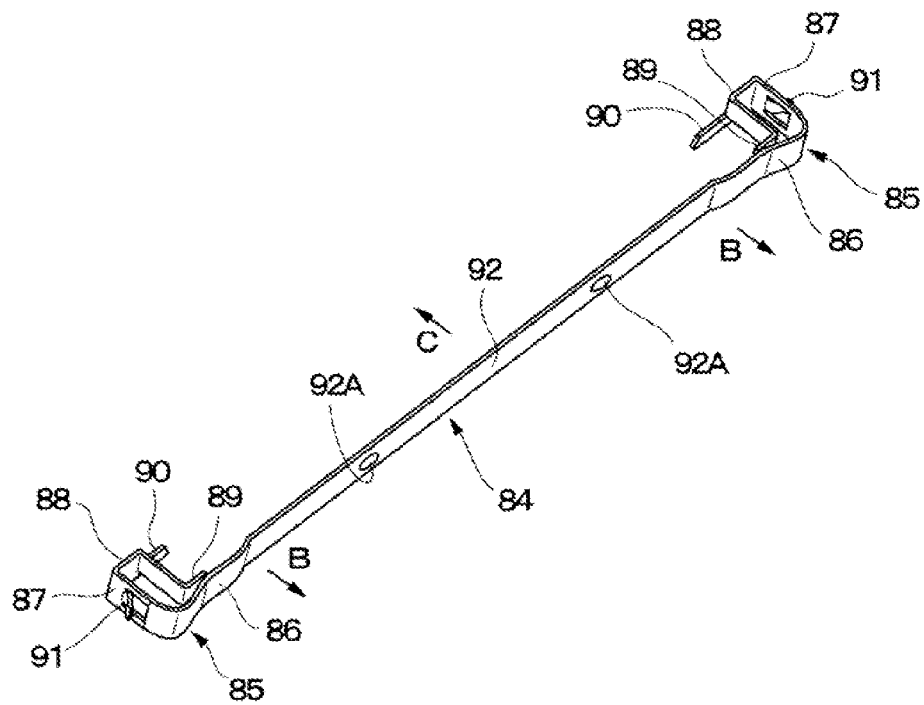
FIG. 21 is a perspective view illustrating the biasing member illustrated in FIG. 19 as a single body.

Next, FIGS. 19 to 21 illustrate a seventh embodiment. The seventh embodiment is characterized by a configuration in which the pad-return function and the wear-following function are performed by a biasing member extending in the disc circumferential direction between the arms of the mounting member. In the seventh embodiment, the same components as those of the first embodiment described above are denoted by the same reference symbols, and the description thereof is herein omitted.

In FIGS. 19 to 21, a mounting member 81, which is used in the seventh embodiment, is illustrated. Similarly to the mounting member 2, which is described in the first embodiment, the mounting member 81 includes a pair of arms 81A, a bearing portion 81B having a large thickness, a reinforcing beam 81C, and the like. Pad guides 82 on the inner side and on the outer side are provided to each of the arms 81A of the mounting member 81. Each of the pad guides 82 is formed as a concave portion having a U-like shape. The ear portions 9A of the friction pads 8 are fitted into the respective pad guides 82 by recess-projection fitting as in the case of the first embodiment. In this manner, the ear portions 9A are supported movably in the disc axial direction.

Concave-groove portions 83 are provided to the mounting member 81 to form a pair of guide surfaces. Similarly to the groove portions 5A and 5B described in the first embodiment, each of the concave-groove portions 83 extends in the disc axial direction corresponding to the direction of movement of the friction pads 8. However, the concave-groove portions 83 are provided at the positions of the respective arms 81A of the mounting member 81, which are below the pad guides 82 (on the inner side in the disc radial direction) and above the reinforcing beam 81C (on the outer side in the disc radial direction).

The concave-groove portions 83 are formed as concave grooves, each having a U-like shape, which are open so as to face each other in the disc circumferential direction (also referred to as "horizontal direction" in the following description). One of the concave-groove portions 83 is provided on the incoming side in the direction of rotation (disc-incoming side) of the disc rotor 1 which rotates in the direction indicated by the arrow A when the vehicle moves forward, whereas the other concave-groove portion 83 is provided on the outgoing side in the direction of rotation (disc-outgoing side) of the disc rotor 1.

A biasing member 84 is provided between the concave-groove portions 83 of the mounting member 81. The biasing member 84 includes pad springs 85 on both horizontal sides and a connection-plate portion 92 described below. The pad springs 85 are respectively mounted on the sides of the respective concave-groove portions 83 in an engaged state. The connection-plate portion 92 is formed so as to extend between the arms 81A of the mounting member 81 so as to connect the pad springs 85 in parallel to the reinforcing beam 81C.

Each of the pad springs 85 of the biasing member 84 includes a pad-return portion 86, a far-side plate portion 87, and a rotor-facing plate portion 88. The pad-return portions 86 of the respective pad springs 85 are formed integrally with both horizontal ends of the connection-plate portion 92 and generate a biasing force in the pad-return direction as described below. The far-side plate portion 87 is formed so as to be curved into an approximately L-like shape with respect to the pad-return portion 86 and is provided on the side of an opening end of the concave-groove portion 83 in a surface contact state. The rotor-facing plate portion 88 is bent into an L-like shape with respect to the far-side plate portion 87 so as to face the disc rotor 1 in the axial direction. Each of the pad springs 85 is formed by being bent into a U-like shape with the pad-return potion 86, the far-side plate portion 87, and the rotor-facing plate portion 88.

A return-restricting portion 89 and an abutment-plate portion 90 are provided to the rotor-facing plate portion 88 of each of the pad springs 85. The return-restricting portion 89 is formed so as to be bent toward the pad-return portion 86 into an L-like shape and is brought into abutment against the back plate 9 of a corresponding one of the friction pads 8. The abutment-plate portion 90 linearly extends from a distal end of the rotor-facing plate portion 88 in the disc circumferential direction (horizontal direction). Similarly to the return-restricting portion 16 described in the first embodiment, the return-restricting portion 89 is formed as a stopper part which can come into abutment against the back plate 9 of a corresponding one of the friction pads 8 and restricts the return position of the friction pad 8 by the pad-return portion 86.

The abutment-plate portion 90 has the same functions as those of the abutment-plate portion 12A described in the first embodiment. Specifically, when the pad-return portions 86 are greatly flexurally deformed in the disc axial direction (direction indicated by the arrow C) together with the friction pad 8, the abutment-plate portions 90 come into direct abutment against the back plate 9 of the friction pad 8 at the position avoiding the lining 10. When the lining 10 of each of the friction pads 8 is worn away, the back plate 9 presses and moves the abutment-plate portion 90 in the direction indicated by the arrow C. As a result, the pad springs 85 are moved in the same direction indicated by the arrow C against claw portions 91 described below.

The claw portion 91 serving as the second spring part (wear-following portion) is extended from the far-side plate portion 87 of each of the pad springs 85. The claw portion 91 is formed by bending a middle portion of the far-side plate portion 87 at an angle outwardly in the disc circumferential direction (horizontal direction). As illustrated in FIG. 19, the return-restricting portions 89 and the abutment-plate portions 90 of the pad springs 85 located on both horizontal sides, that is, on the right and left sides of the biasing member 84, partially cover the back plate 9 of a corresponding one of the friction pads 8 from the disc axial direction as illustrated in FIG. 20. The claw portions 91 on both horizontal sides are locked in an elastically deformed state inside the respective concave-groove portions 83 of the mounting member 81.

The claw portion 91 of the right pad spring 85 of the right and left pad springs 85 is mounted in an elastically deformed state with an interference into one of the concave-groove portions 83 located on the disc-incoming side so as to bias the entire biasing member 84 toward the other concave-groove portion 83 which is located on the disc-outgoing side. On the other hand, the claw portion 91 of the pad spring 85 located on the left in FIG. 19 is mounted in an elastically deformed state with an interference in the concave-groove portion 83 on the disc-outgoing side so as to bias the entire biasing member 84 toward the concave-groove portion 83 on the disc-incoming side.

Therefore, each of the pad springs 85 of the biasing member 84 remains in the position illustrated in FIG. 20 in accordance with the biasing force applied by the right and left claw portions 91 (frictional resistance against the concave-groove portions 83) while the right and left pad-return portions 86 are in a flexurally deformed state within a predetermined range. Therefore, the pad springs 85 do not move in the disc axial direction (directions indicated by the arrows B and C) along the concave-groove portions 83. On the other hand, when each of the pad-return portions 86 is greatly flexurally deformed beyond the predetermined range to be elastically deformed by the amount equal to or larger than the predetermined amount of deflection to the positions at which the back plate 9 comes into direct abutment against the abutment-plate portion 90, the pad springs 85 of the biasing member 84 can respectively move in the direction indicated by the arrow C in the concave-groove portions 83 regardless of the biasing force applied by the claw portions 91 (frictional resistance against the concave-groove portions 83).

Specifically, the frictional resistance of the claw portions 91 against the concave-groove portions 83 is set larger than the spring force (biasing force) of the pad-return portions 86. However, while the braking operation is repeated, the lining 10 of each of the friction pads 8 is worn away. When each of the friction pads 8 is pressed to move in the direction indicated by the arrow C in accordance with the wear of the linings 10, the movement of the pad springs 85 of the biasing member 84 in the disc axial direction (direction indicated by the arrow C) along the concave-groove portions 83 is allowed by the claw portions 91 as the wear-following portions.

Together with the right and left pad springs 85, the connection-plate portion 92 constitutes the biasing member 84. The connection-plate portion 92 is formed to have an elongated flat-plate shape which connects the right and left pad springs 85 to each other and extends between the arms 81A of the mounting member 81 in parallel to the reinforcing beam 81C. Both ends of the connection-plate portion 92 are connected integrally with the pad-return portions 86 of the right and left pad springs 85, respectively.

In the middle of the connection-plate portion 92 in the length direction, for example, two mounting holes 92A are formed. The biasing member 84 is removably fixed to the back plate 9 of the friction pad 8 through an intermediation of the connection-plate portion 92 by fastening members 93 (for example, screws, bolts or the like) inserted into the mounting holes 92A. In this manner, both ends of the connection-plate portion 92 and the right and left pad-return portions 86 are elastically curved so as to be separated apart from the surface of the back plate 9 in the direction indicated by the arrow B as illustrated in FIG. 20, and hence the return-restricting portions 89 are placed in a state in which the return-restricting portions 89 are held in abutment against the outer surface of the back plate 9.

When the right and left pad springs 85 are respectively mounted into the right and left concave-groove portions 83 of the mounting member 81, the biasing member 84 brings the far-side plate portions 87 and the claw portions 91 into abutment against (locks the far-side plate portions 87 and the claw portions 91 to) the concave-groove portions 83. In this state, the initial deflection is applied to the pad-return portions 86 by the elastic deformation to hold the back plate 9 of a corresponding one of the friction pads 8 in abutment against the return-restricting portions 89. Then, when the braking operation of the vehicle is performed, the biasing member 84 is pressed to move in the direction indicated by the arrow C together with the back plate 9 of a corresponding one of the friction pads 8. When the braking operation is released, the biasing member 84 moves in the direction indicated by the arrow B.

When the braking operation of the vehicle is performed, the biasing member 84 is pressed to move in the direction indicated by the arrow C together with the back plate 9 of a corresponding one of the friction pads 8. The back plate 9 separates apart from the return-restricting portions 89 of the pad springs 85 so as to be moved to the position at which the inner surface of the back plate 9 (on the side of a joint surface with respect to the lining 10) comes closer to (or comes into abutment against) the abutment-plate portion 90. On the other hand, each of the pad springs 85 remains, for example, in the position illustrated in FIG. 20 by the frictional resistance of the claw portions 91. Therefore, the amount of flexural deformation of the pad-return portions 86 becomes larger to generate the biasing force for returning a corresponding one of the friction pads 8 in the direction indicated by the arrow B. Therefore, when the braking operation is released, the entire friction pad 8 is returned in the direction indicated by the arrow B by the right and left pad-return portions 86 of the biasing member 84. As a result, the friction pad 8 is held in the position (return position) away from the disc rotor 1 while the back plate 9 is held in abutment against the return-restricting portions 89.

On the other hand, when the lining 10 of each of the friction pads 8 is worn away, the friction pads 8 are greatly axially pressed to be moved by the amount of wear in the disc axial direction (direction indicated by the arrow C illustrated in FIG. 20) by the caliper main body 6 to the position at which the linings 10 come into abutment against the surface of the disc rotor 1. As a result, the back plate 9 comes into direct abutment against the abutment-plate portions 90 so that the pad springs 85 are pressed in the same direction indicated by the arrow C. When the pressing force at this time exceeds the biasing force applied by the claw portions 91 (frictional resistance force against the concave-groove portions 83), the entire pad springs 85 gradually move in the disc axial direction (direction indicated by the arrow C) along the concave-groove portions 83. As a result, when the lining 10 of each of the friction pads 8 is worn away while the braking operation is repeated and the friction pads 8 are pressed to be moved in the direction indicated by the arrow C illustrated in FIG. 20 in accordance with the wear, the movement of the entire pad springs 85 in the disc axial direction (direction indicated by the arrow C) along the concave-groove portions 83 is allowed by the claw portions 91 as the wear-following portions.

As described above, even in the seventh embodiment configured as described above, approximately the same functions and effects as those of the first embodiment described above can be obtained. Specifically, when the braking operation is released, the back plate 9 of each of the friction pads 8 can be returned to the positions of the return-restricting portions 89 by the pad-return portions 86 provided on the right and left sides of the connection-plate portion 92. Therefore, the dragging of the friction pads 8 while the vehicle is running can be prevented. In addition, each of the pad-return portions 86 of the pad springs 85 and each of the claw portions 91 serving as the wear-following portions are formed at the positions different from each other. Therefore, the wear-following function and the pad-return function of the biasing member 84 can be performed as separate functions. Therefore, the wear of the pad-return portions 86 and the claw portions 91 is suppressed to improve the durability and the lifetime.

Figure 22:
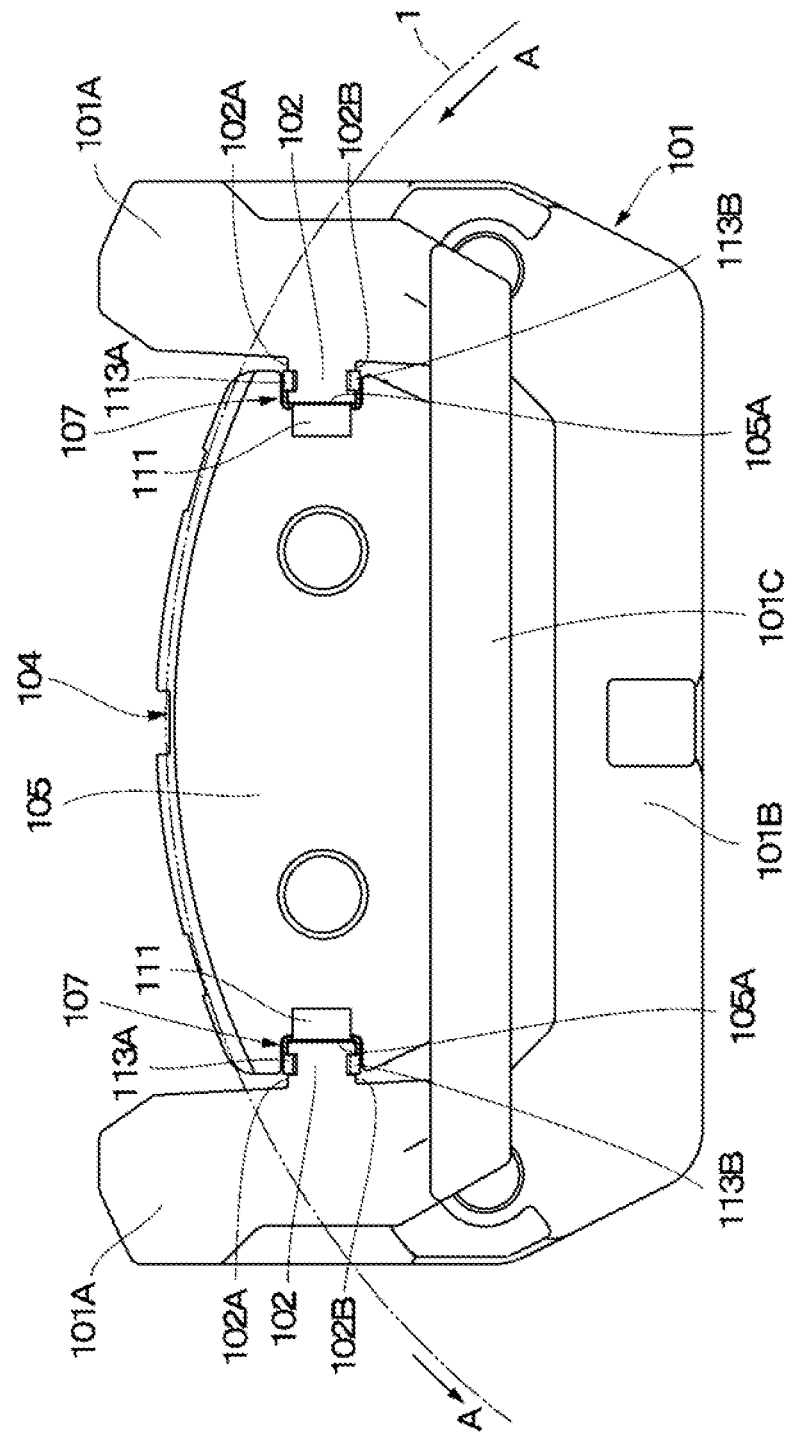
FIG. 22 is a front view illustrating a disc brake apparatus according to an eighth embodiment in a state in which a caliper main body is removed therefrom.
Figure 23:
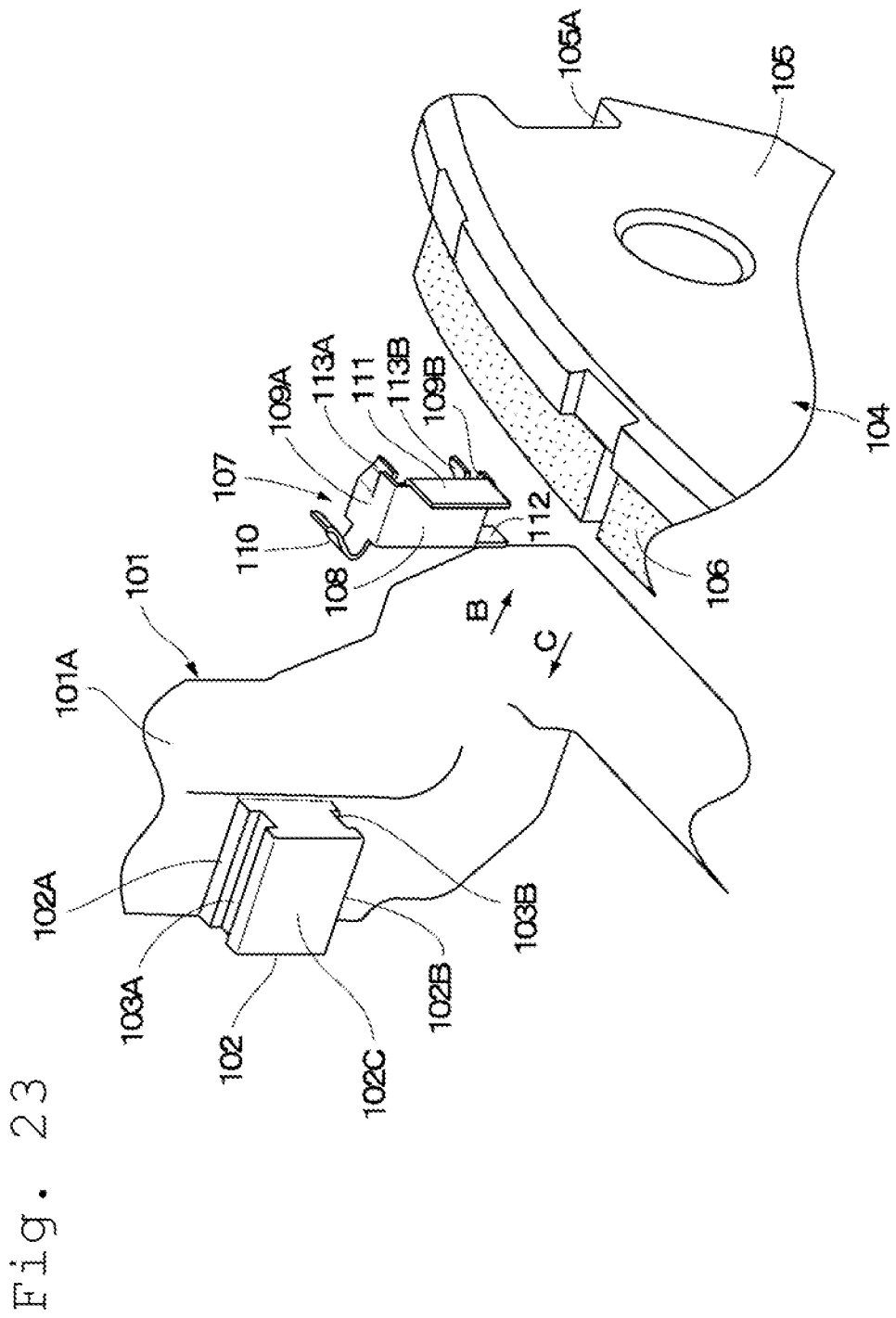
FIG. 23 is an exploded perspective view illustrating a state in which a friction pad is mounted to a pad guide of a mounting member through an intermediation of a biasing member.

Next, FIGS. 22 and 23 illustrate an eighth embodiment. The eighth embodiment is characterized by a configuration in which a pad guide provided to each of arms of a mounting member is formed to have a convex shape and concave portions for recess-projection fitting to the pad guides are provided to the back plate of each of the friction pads so as to be located on both sides of the back plate in the disc circumferential direction. In the eighth embodiment, the same components as those of the first embodiment described above are denoted by the same reference symbols, and the description thereof is herein omitted.

In FIGS. 22 and 23, a mounting member 101, which is used in the eighth embodiment, is illustrated. Similarly to the mounting member 2, which is described in the first embodiment, the mounting member 101 includes a pair of arms 101A, a bearing portion 101B having a large thickness, a reinforcing beam 101C, and the like. Pad guides 102 on the inner side and on the outer side are provided to each of the arms 101A of the mounting member 101. Each of the pad guides 102 is formed as a convex portion having a U-like shape. Specifically, each of the pad guides 102 having the convex shape includes, as illustrated in FIG. 23, one side surface portion 102A (hereinafter, referred to as "upper wall surface 102A"), another side surface portion 102B (hereinafter, referred to as "lower wall surface 102B), and a projection-side wall surface 102C. The upper wall surface 102A is located on the outer side in the disc radial direction. The lower wall surface 102B is located on the inner side in the disc radial direction. The projection-side wall surface 102C is located on the side of a projecting end of the pad guide 102 so as to connect the upper wall surface 102A and the lower wall surface 102B to each other.

A concave portion 105A of a friction pad 104 described below is fitted by recess-projection fitting over the upper wall surface 102A and the lower wall surface 102B of the pad guide 102. As a result, the concave portion 105A is supported movably in the disc axial direction along the upper wall surface 102A and the lower wall surface 102B. Moreover, the projection-side wall surface 102C of the pad guide 102 constitutes a torque-receiving portion which receives the braking torque generated at the time of the braking operation from the friction pad 104 through the concave portion 105A.

On the upper wall surface 102A of the pad guide 102, an upper groove portion 103A serving as one guide surface having a U-like cross section, which extends in the disc axial direction, is formed as illustrated in FIG. 23. On the lower wall surface 102B of the pad guide 102, a lower groove portion 103B serving as another guide surface having a U-like cross section, which extends in the disc axial direction, is similarly formed. An upper claw portion 113A of a biasing member 107 described below is mounted into the upper groove portion 103A, whereas a lower claw portion 113B described below is mounted into the lower groove portion 103B.

Similarly to the friction pad 8 described in the first embodiment, the friction pad 104, which is used in the eighth embodiment, includes a back plate 105 and a lining 106. The concave portions 105A are formed on both sides of the back plate 105 of the friction pad 104 in the disc circumferential direction. The concave portions 105 are fitted over the pad guides 102, each having a convex shape, by the recess-projection fitting.

Each of the biasing members 107 used in the eighth embodiment is configured approximately in the same manner as the biasing member 11 described in the first embodiment. Each of the biasing members 107 is provided between each of the pad guides 102 of the mounting member 101 and each corresponding concave portion 105A of the friction pad 104. However, each of the biasing members 107 of the eighth embodiment includes a flat-plate portion 108, and facing plate portions 109A and 109B. The flat-plate portion 108 is formed to have a flat-plate shape so as to cover the pad guide 102 having the convex shape. The facing plate portions 109A and 109B are formed on the upper side and the lower side of the flat plate portion 108 so that each of the facing plate portions 109A and 109B is bent into an L-like shape. The facing plate portions 109A and 109B respectively face the upper wall surface 102A and the lower wall surface 102B in the disc radial direction (vertical direction).

Each of the biasing members 107 includes the flat-plate portion 108, the upper facing plate portion 109A, and the lower facing plate portion 109B, and is formed to have an U-like shape by bending. A pad-return portion 110 serving as the first spring part, which is formed so as to be bent upward at an angle, is provided to the upper facing plate portion 109A. The pad-return portion 110 comes into abutment against the back plate 105 of the friction pad 104 to generate a biasing force in the pad-return direction.

A return-restricting portion 111 is provided to the flat-plate portion 108 so as to be located at the end of the flat-plate portion 108, which is on the side opposite to the pad-return portion 110 in the disc axial direction. The return-restricting portion 111 comes into abutment against a surface of the back plate 105 on the inner side in the disc circumferential direction as compared with the position of the concave portion 105A. In this manner, similarly to the return-restricting portion 16 described in the first embodiment, the return-restricting portion 111 restricts the return position of the friction pad 104.

An abutment-plate portion 112 formed by being bent downward in an L-like shape is provided at a position of the lower facing-plate portion 109B, which is below the pad-return portion 110. The abutment-plate portion 112 has the same functions as those of the abutment-plate portion 12A described in the first embodiment. Specifically, when the pad-return portion 110 is greatly flexurally deformed in the disc axial direction (direction indicated by the arrow C) together with a corresponding one of the friction pads 104, the abutment-plate portion 112 comes into direct abutment against the back plate 105 of the friction pad 104 at the position avoiding the lining 106. When the lining 106 of each of the friction pads 104 is worn away, the back plate 105 presses the abutment-plate portion 112 in the direction indicated by the arrow C. As a result, the biasing member 107 is moved in the same direction indicated by the arrow C against claw portions 113A and 113B described below.

The upper claw portion 113A serving as the second spring part (wear-following portion) is extended from the upper facing-plate portion 109A so as to be located on the side opposite to the pad-return portion 110 in the disc axial direction. The upper claw portion 113A is formed by bending a part of the facing plate portion 109A downward at an angle. The lower claw portion 113B serving as the second spring part (wear-following potion) is extended from the lower facing-plate portion 109B so as to be located on the side opposite to the abutment-plate portion 112 in the disc axial direction. The lower claw portion 113B is formed by bending a part of the facing plate portion 109B upward at an angle.

The upper claw portion 113A and the lower claw portion 113B are mounted in an elastically deformed state in the upper groove portion 103A and the lower groove portion 103B of the pad guide 102 with interferences, respectively, and function similarly to the claw portions 15A and 15B described in the first embodiment. Specifically, while the braking operation is repeated, the lining 106 of each of the friction pads 104 is worn away. When each of the friction pads 104 is pressed to be moved in the direction indicated by the arrow C in accordance with the wear of the linings 106, the movement of the entire biasing member 107 in the disc axial direction (direction indicated by the arrow C) along the upper groove portion 103A and the lower groove portion 103B of the pad guide 102 is allowed by the upper claw portion 113A and the lower claw portion 113B as the wear-following portions.

As described above, even in the eighth embodiment configured as described above, approximately the same functions and effects as those of the first embodiment described above can be obtained. Specifically, when the braking operation is released, the back plate 105 of each of the friction pads 104 can be returned to the position of the return-restricting portion 111 by the pad-return portion 110 of the biasing member 107. Therefore, the dragging of the friction pads 104 while the vehicle is running can be prevented. In addition, the pad-return portion 110 of the biasing member 107 and each of the claw portions 113A and 113B serving as the wear-following portions are formed at the positions different from each other. Therefore, the wear-following function and the pad-return function of the biasing member 107 can be performed as separate functions. Therefore, the wear of the pad-return portion 110 and the claw portions 113A and 113B are suppressed to improve the durability and the lifetime.

Figure 24:
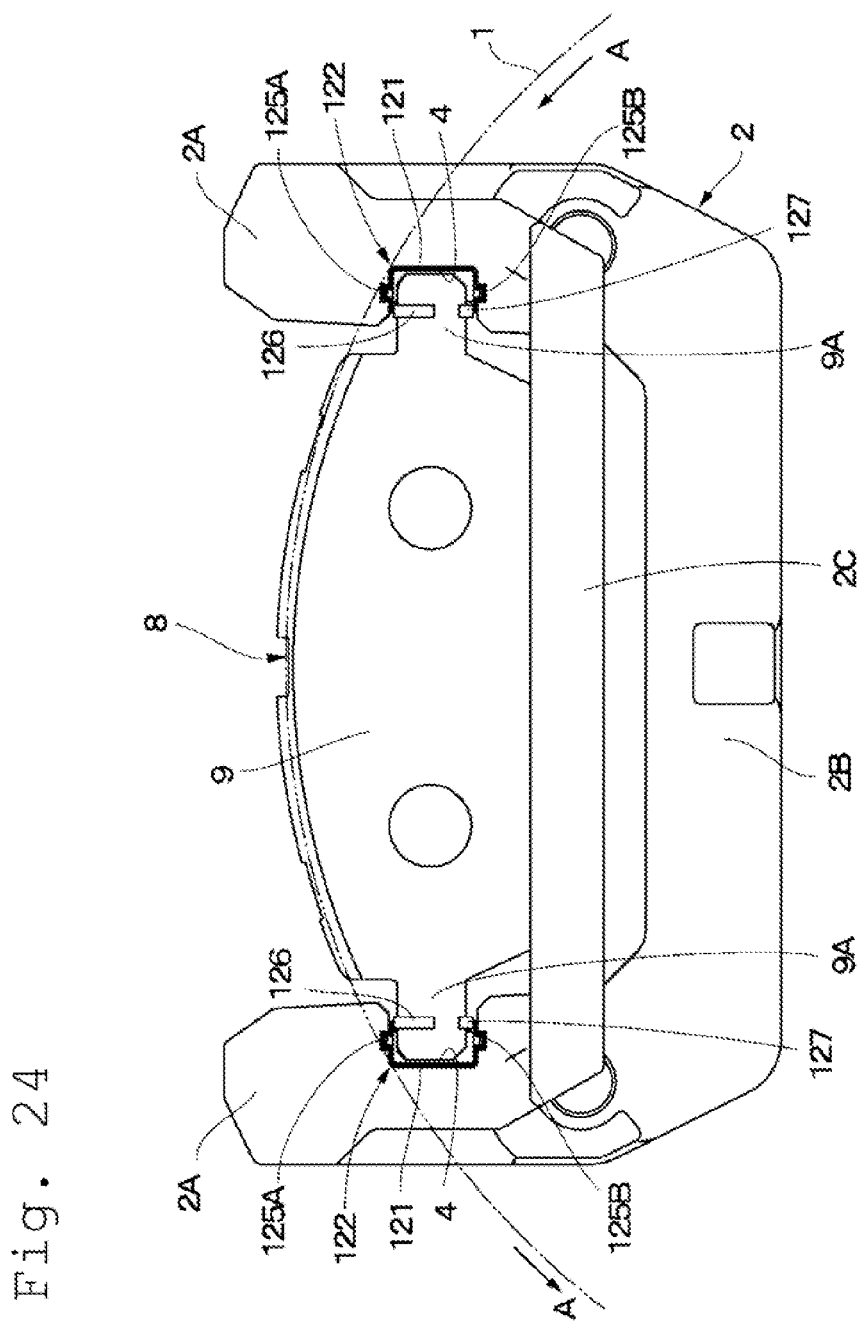
FIG. 24 is a front view illustrating a disc brake apparatus according to a ninth embodiment in a state in which a caliper main body is removed therefrom.
Figure 25:
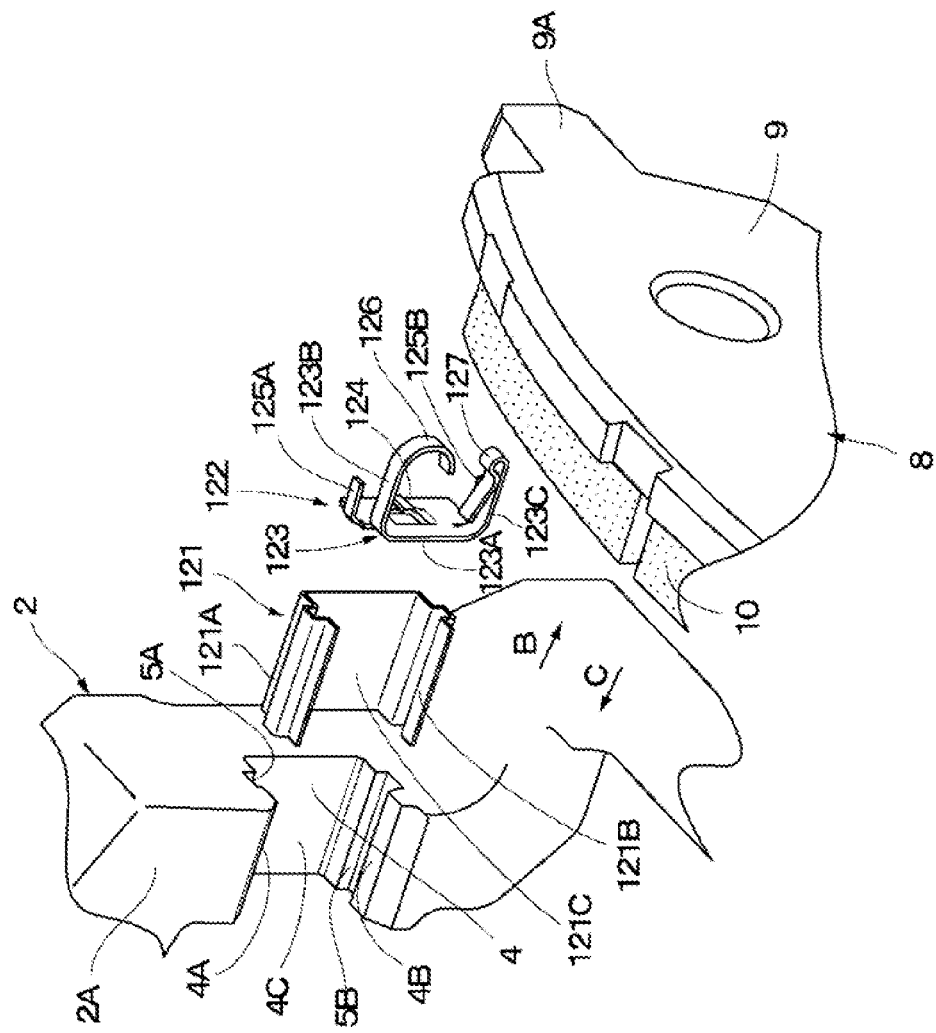
FIG. 25 is an exploded perspective view illustrating a state in which a friction pad is mounted to a pad guide of a mounting member through an intermediation of a guide member and a biasing member.

Next, FIGS. 24 and 25 illustrate a ninth embodiment. The ninth embodiment is characterized by a configuration in which a guide member which is a separate body is provided between the pad guide on the mounting member and the biasing member so as to stabilize a sliding resistance of the biasing member. In the ninth embodiment, the same components as those of the first embodiment described above are denoted by the same reference symbols, and the description thereof is herein omitted.

In FIGS. 24 and 25, a guide member 121 used in the ninth embodiment is illustrated. The guide member 121 is formed by using a metal plate material such as stainless steel having good sliding characteristics and is mounted so as to be fitted inside the pad guide 4. The guide member 121 includes an upper plate portion 121A, a lower plate portion 121B, and a far-side plate portion 121C and is formed by being bent into an approximately U-like shape. The upper plate portion 121A is formed to have a shape corresponding to the upper wall surface 4A having the upper groove portion 5A so as to cover the upper wall surface 4A from the lower side.

The lower plate portion 121B is formed to have a shape corresponding to the lower wall surface 4B having the lower groove portion 5B so as to cover the lower wall surface 4B from the upper side. The far-side plate portion 121C is formed to have a shape so as to cover the far-side wall surface 4C from the inner side. The upper plate portion 121A of the guide member 121 forms one guide surface which has a U-like cross section and extends in the disc axial direction, whereas the lower plate portion 121B forms another guide surface which similarly has a U-like cross section and extends in the disc axial direction.

A biasing member 122 is provided between the guide member 121 and a corresponding one of the ear portions 9A of the friction pads 8. The biasing member 122 is formed in approximately the same manner as the biasing member 11 described in the first embodiment. Specifically, the biasing member 122 includes a main body portion 123, a pad-return portion 124, an upper claw portion 125A and a lower claw portion 125B each serving as the wear-following portion, a return-restricting portion 126, and a radially-biasing portion 127.

The main body portion 123 of the biasing member 122 includes an abutment-plate portion 123A and two concave-portion facing plate portions 123B and 123C, and is formed to have a U-like shape as a whole. The abutment-plate portion 123A serves as the rotor-facing plate portion provided at the position at which the abutment-plate portion 123A faces the surface of the disc rotor 1 in the disc axial direction. The concave-portion facing plate portions 123B and 123C are respectively formed at the upper end and the lower end of the abutment-plate portion 123A so as to be integrated therewith. When the pad-return portion 124 is greatly flexurally deformed in the direction indicated by the arrow C in FIG. 25, a corresponding one of the ear portions 9A of the friction pads 8 comes into direct abutment against the abutment-plate portion 123A of the main body portion 123. The pad return portion 124, the upper claw portion 125A, and the lower claw portion 125B are extended from the abutment-plate portion 123A of the main body portion 123.

The return-restricting portion 126 is formed integrally with the upper concave-portion facing plate portion 123B at a distal end thereof, whereas the radially-biasing portion 127 is formed integrally with the lower concave-portion facing plate portion 123C at a distal end thereof. However, a part corresponding to the far-side plate portion 13 described in the first embodiment is eliminated from the biasing member 122 of the ninth embodiment. Specifically, in a state in which the biasing member 122 is inserted into the guide member 121, the far-side plate portion 121C of the guide member 121 has the function of receiving the braking torque as in the case of the far-side plate portion 13.

As described above, even in the ninth embodiment configured as described above, approximately the same functions and effects as those of the first embodiment described above can be obtained. In the ninth embodiment, in particular, the guide member 121, which is a separate body, is provided between the pad guide 4 on the side of the mounting member 2 and the biasing member 122. As a result, for example, the sliding resistance of the biasing member 122 against the guide member 121 can be stabilized.

Figure 26:
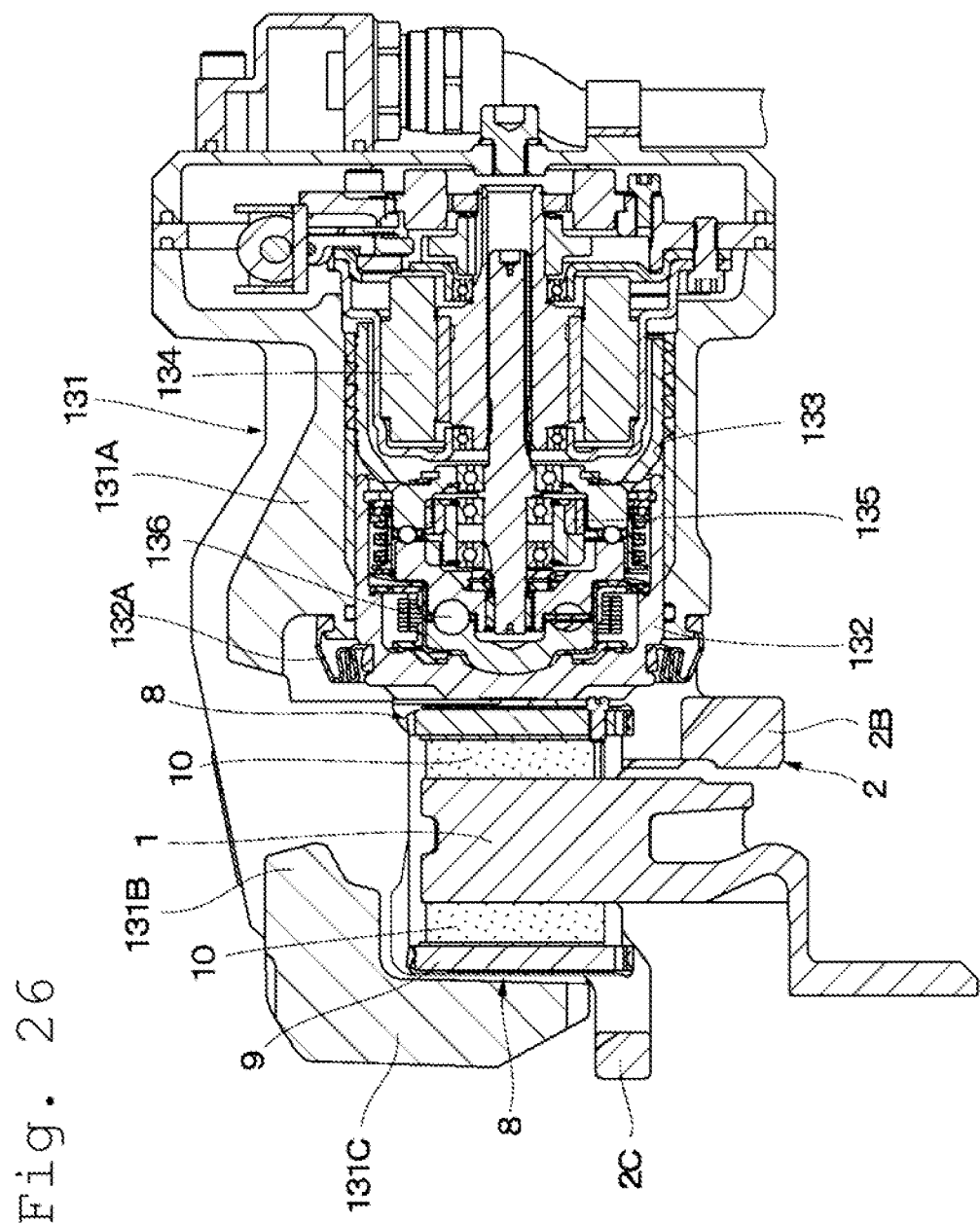
FIG. 26 is a longitudinal sectional view illustrating an electric disc brake apparatus according to a tenth embodiment.

Next, FIG. 26 illustrates a tenth embodiment. The tenth embodiment is characterized by a configuration in which the piston provided to the caliper main body is driven by an electric motor. In the tenth embodiment, the same components as those of the first embodiment described above are denoted by the same reference symbols, and the description thereof is herein omitted.

In FIG. 26, a caliper main body 131 used in the tenth embodiment is illustrated. The caliper main body 131 is configured in approximately the same manner as the caliper main body 6 described in the first embodiment. Thus, the caliper main body 131 includes an inner leg portion 131A, a bridge portion 131B, and an outer leg portion 131C. A cylinder 133, into which a piston 132 is slidably inserted, is provided to the inner leg portion 131A of the caliper main body 131. A piston seal 132A is provided between an opening end side of the cylinder 133 and the piston 132.

An electric motor 134, a differential reduction gear mechanism 135, and a rotary-to-linear conversion mechanism 136 are provided between the piston 132 and the cylinder 133 inside the inner leg portion 131A. The rotary-to-linear conversion mechanism 136 is configured by, for example, a ball-screw mechanism or a ball-lamp mechanism. While the rotary movement of the electric motor 134 is decelerated by the differential reduction gear mechanism 135, the rotary movement is converted into the linear movement of the piston 132 by using the rotary-to-linear conversion mechanism 136. Then, the friction pads 8 are pressed by the piston 132 against the disc rotor 1 to generate a braking force.

As described above, even in the tenth embodiment configured as described above, by providing the biasing member (for example, any one of the biasing members 11, 21, 31, 41, 51, 61, 84, 107, and 122 described in the first to ninth embodiments) between each of the arms 2A of the mounting member 2 and each of the friction pads 8, approximately the same functions and effects as those of each of the embodiments can be obtained. As a result, the wear of the biasing members is suppressed to improve the durability and the lifetime.

In the first embodiment described above, the case where the torque-receiving portion is constituted by the far-side wall surface 4C of the pad guide 4 which is formed of the concave groove having the U-like shape has been described as an example. However, the present invention is not limited thereto. For example, the present invention is also applicable to the type of disc brake apparatus having a configuration in which a torque-receiving surface as a torque-receiving portion is provided at a position of each of the arms of the mounting member, which is separated apart from the pad guide (position different from the position of the pad guide).

In each of the embodiments described above, a so-called floating-type disc brake apparatus in which the caliper main body 6 can slide with respect to the mounting member 2 through an intermediation of the sliding pins has been described as an example. However, the present invention is not limited thereto. The present invention may be applied to a so-called opposed-type disc brake apparatus in which a caliper maim body having the cylinder and the piston, which face the two surfaces of the disc rotor, is fixed to the non-rotating portion of the vehicle. In this case, the caliper main body, on which brake pads slide, constitutes the mounting member of the present invention.

Next, the invention encompassed in the embodiments described above is described. The stopper part is provided to the biasing member. When each of the friction pads is moved in the direction separating apart from the disc rotor by the biasing force of the first spring parts, the stopper parts come into abutment against the friction pad to restrict the return position of the friction pad. In this manner, when the braking operation is released, each of the friction pads can be returned to the position of the stopper parts by the first spring parts. As a result, the dragging of the friction pads while the vehicle is running can be prevented. Moreover, the amount of return of the friction pads can be kept constant to improve the pedal feel on the side of the brake pedal.

Moreover, the mounting member has one of a concave portion and a convex portion, and the friction pad has the other of the concave portion and the convex portion, for recess-projection fitting. The biasing member is provided between the concave portion and the convex portion. In this manner, the friction pad can be smoothly moved in the disc axial direction along the concave portion of the mounting member, which is fitted to the convex portion by the recess-projection fitting. As a result, the wear-following function and the pad-return function by the biasing member can be stabilized.

Each of the friction pads has the convex portions at the positions corresponding to the ends of the disc rotor in the circumferential direction. The concave portions for the recess-projection fitting with the convex portions are provided to the mounting member. Each of the biasing members covers a corresponding one of the convex portions from the axial direction of the disc rotor so as to be locked in the elastically deformed state in a corresponding one of the concave portions. In this manner, the wear-following function and the pad-return function by the biasing member can be stabilized.

On the other hand, the biasing member includes the main body portion formed into the U-like shape, from which the first spring part and the second spring part extend. The main body portion includes the two concave-portion facing plate portions which face the concave portion in the radial direction of the disc rotor and the rotor-facing plate portion facing the disc rotor in the axial direction. With the configuration described above, the second spring part can be provided to one or both of the two concave-portion facing plate portions. The first spring part can be provided at the position away from the second spring part.

Specifically, the first spring part can be configured to be extended from the rotor-facing plate portion of the main body portion. On the other hand, the second spring part can be configured to be extended from at least one of the concave-portion facing plate portions of the main body portion. In this manner, the first spring part and the second spring part can be formed of two types of spring pieces provided at the positions away from each other. Therefore, the wear-following function and the pad-return function of the biasing member can be performed as separate functions. As a result, the wear of each of the spring pieces can be suppressed to improve the durability and the lifetime.

On the other hand, the radial spring part extended from the main body portion to bias a corresponding one of the friction pads outward in the radial direction of the disc rotor is provided to the biasing member. In this manner, the radial spring part can be formed integrally with the biasing member. As a result, the rattling of the friction pads in the disc radial direction can be suppressed to stabilize the attitudes of the friction pads.

Further, the pair of biasing members are movably provided to the mounting member so as to be separated apart from each other in the circumferential direction of the disc rotor. Of the pair of biasing members, the biasing member on the disc-incoming side may be provided with the circumferential spring part for biasing a corresponding one of the friction pads to the disc-outgoing side in the circumferential direction of the disc rotor. Therefore, the rattling of the friction pads in the circumferential direction of the disc rotor by vibrations generated when the vehicle runs can be suppressed by the circumferential spring part provided to the biasing member on the disc-incoming side. Then, the braking torque received by the friction pads from the disc rotor due to the braking operation when the vehicle moves forward can be received by the arm on the disc-outgoing side. Therefore, a problem of generation of abnormal noise by the movement of the friction pads due to the braking torque can be eliminated.

Further, the piston driven by the electric motor to press the friction pads toward the disc rotor may be provided to the caliper. In this case, the disc brake apparatus can perform and release a braking operation by electric control without using a working fluid such as a brake fluid.

According to the embodiments described above, the wear of the biasing members for biasing the friction pads in the disc brake apparatus is suppressed to improve the durability and the lifetime.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority to Japanese Patent Applications No. 2011-146727 filed on Jun. 30, 2011. The entire disclosure of Japanese Patent Applications No. 2011-146727 filed on Jun. 30, 2011 including specification, claims, drawings and summary is incorporated herein by reference in its entirety.

What is claimed is:

1. A disc brake apparatus, comprising:
a caliper to be mounted to a non-rotating portion of a vehicle;
a friction pad including a lining made of a friction material, the friction pad being provided to face the disc rotor and pressed by the caliper toward the disc rotor;
two guide surfaces provided to the caliper, the two guide surfaces extending in a direction of movement of the friction pad; and
a biasing member to be brought into abutment against the two guide surfaces and provided so as to be movable in a direction approaching to the disc rotor in accordance with wear of the lining of the friction pad, wherein:
the biasing member comprises:
a main body portion;
a first spring part extending from the main body portion such that the first spring part can be flexurally deformed, the first spring part being configured to be brought into abutment against the friction pad at the distal end of the first spring part for biasing the friction pad relative to the main body portion in a direction separating apart from the disc rotor; and
a second spring part, provided separately from the first spring part and configured to be brought into abutment against one of the two guide surfaces, for biasing the main body portion toward the other of the two guide surfaces; and
the second spring part restricts the movement of the biasing member relative to the caliper until the first spring part is elastically deformed by a predetermined deflection amount by the movement of the friction pad.

2. A disc brake apparatus according to claim 1, wherein:
the biasing member is provided with a stopper part; and
the stopper part comes into abutment against the friction pad when the friction pad moves in the direction separating apart from the disc rotor by a biasing force of the first spring part, to thereby restrict a return position of the friction pad.

3. A disc brake apparatus according to claim 1, wherein:
each of the caliper and the friction pad has one of a concave portion and a convex portion, for recess-projection fitting; and
the biasing member is provided between the concave portion and the convex portion.

4. A disc brake apparatus according to claim 3, wherein:
the biasing member is formed into a U-like shape for fitting into the concave portion; and
the main body portion comprises:
two concave-portion facing plate portions facing the concave portion in a radial direction of the disc rotor; and
a rotor-facing plate portion facing the disc rotor in an axial direction of the disc rotor.

5. A disc brake apparatus according to claim 4, wherein the first spring part is extended from the rotor-facing plate portion of the main body portion.

6. A disc brake apparatus according to claim 4, wherein the second spring part is extended from at least one of the two concave-portion facing plate portions of the main body portion.

7. A disc brake apparatus according to claim 4, wherein the biasing member is provided with a radial spring part extended from the main body portion to bias the friction pad outward in the radial direction of the disc rotor.

8. A disc brake apparatus according to claim 1, wherein:
the friction pad has a convex portion at a position corresponding to a circumferential end of the disc rotor;
the caliper is provided with a concave portion into which the convex portion is fitted by recess-projection fitting; and
the biasing member covers the convex portion from an axial direction of the disc rotor and is locked in an elastically deformed state inside the concave portion.

9. A disc brake apparatus according to claim 1, wherein:
a pair of biasing members are provided movably to the caliper and are arranged such that the biasing members are separated apart from each other in a circumferential direction of the disc rotor; and
one of the pair of biasing members on a disc-incoming side is provided with a circumferential spring part for biasing the friction pad to a disc-outgoing side in the circumferential direction of the friction pad.

10. A disc brake apparatus according to claim 1, wherein the caliper comprises a piston driven by an electric motor to press the friction pad toward the disc rotor.

11. A disc brake apparatus according to claim 1, wherein:
the caliper comprises:
a mounting member mounted to the non-rotating portion of the vehicle; and
a caliper main body movably provided to the mounting member; and
the two guide surfaces are provided to the mounting member.

12. A disc brake apparatus according to claim 1, wherein:
the caliper comprises a caliper main body to be mounted to the non-rotating portion of the vehicle; and
the two guide surfaces are provided to the caliper main body.

13. A disc brake apparatus, comprising:
a mounting member to be mounted to a non-rotating portion of a vehicle;
a friction pad having a lining to be brought into abutment against a disc rotor, the friction pad being movably provided to the mounting member by a caliper main body provided to the mounting member;
two guide surfaces provided to the mounting member, the two guide surfaces extending in a direction of movement of the friction pad;
a biasing member to be brought into abutment against the two guide surfaces and provided movably in a direction approaching to the disc rotor in accordance with wear of the lining of the friction pad, wherein:
the biasing member comprises:
a main body portion;
a first spring part extending from the main body portion such that the first spring part can be flexurally deformed, the first spring part being configured to be brought into abutment against the friction pad at the distal end of the first spring part for biasing the friction pad relative to the main body portion in a direction separating apart from the disc rotor;

a second spring part provided separately from the first spring part and configured to be brought into abutment against one of the two guide surfaces to bias the main body portion to the other of the two guide surfaces; and a stopper part to be brought into abutment against the friction pad to restrict a return position of the friction pad when the friction pad moves in the direction separating apart from the disc rotor by a biasing force of the first spring part; and the second spring part restricts the movement of the biasing member relative to the mounting member until the first spring part is elastically deformed by a predetermined deflection amount by the movement of the friction pad.

14. A disc brake apparatus according to claim 13, wherein: each of the mounting member and the friction pad has one of a concave portion and a convex portion, for recess-projection fitting; and the biasing member is provided between the concave portion and the convex portion.

15. A disc brake apparatus according to claim 14, wherein: the biasing member is formed into a U-like shape for fitting into the concave portion; and the main body portion comprises:
two concave-portion facing plate portions facing the concave portion in a radial direction of the disc rotor; and
a rotor-facing plate portion facing the disc rotor in an axial direction of the disc rotor.

16. A disc brake apparatus according to claim 15, wherein the first spring part is extended from the rotor-facing plate portion of the main body portion.

17. A disc brake apparatus according to claim 15, wherein the second spring part is extended from at least one of the two concave-portion facing plate portions of the main body portion.

18. A disc brake apparatus according to claim 15, wherein the biasing member is provided with a radial spring part extended from the main body portion to bias the friction pad outward in the radial direction of the disc rotor.

19. A disc brake apparatus, comprising:
a mounting member provided to a non-rotating portion of a vehicle and includes two guide surfaces on which a friction pad is provided, the two guide surfaces being formed to extend in a direction of movement of the friction pad, the friction pad including a lining and being provided so as to face a disc rotor, the friction pad being movable in a direction approaching to the disc rotor;

a biasing member to be brought into abutment against the two guide surfaces between a concave portion and a convex portion by which the mounting member and the friction pad are fitted to each other by recess-projection fitting, wherein:

the biasing member comprises:
a main body portion;
a first spring part extending from the main body portion such that the first spring part can be flexurally deformed, the first spring part being configured to be brought into abutment against the friction pad at the distal end of the first spring part for biasing the friction pad relative to the main body portion in a direction separating apart from the disc rotor;

a second spring part provided separately from the first spring part and configured to be brought into abutment against one of the two guide surfaces to bias the main body portion toward the other of the two guide surfaces so that the mounting member is movable in a direction approaching the disc rotor in accordance with wear of the lining of the friction pad; and a stopper part to be brought into abutment against the friction pad to restrict a return position of the friction pad when the friction pad moves in the direction separating apart from the disc rotor by a biasing force of the first spring part; and the second spring part restricts the movement of the biasing member relative to the mounting member until the first spring part is elastically deformed by a predetermined deflection amount by the movement of the friction pad.

20. A disc brake apparatus according to claim 19, wherein: the biasing member is formed into a U-like shape for fitting into the concave portion; and the main body portion comprises:
two concave-portion facing plate portions facing the concave portion in a radial direction of the disc rotor; and
a rotor-facing plate portion facing the disc rotor in an axial direction of the disc rotor.

* * * * *